US007853468B2

(12) United States Patent
Callahan et al.

(10) Patent No.: US 7,853,468 B2
(45) Date of Patent: Dec. 14, 2010

(54) SYSTEM AND METHODS FOR INTEGRATED COMPLIANCE MONITORING

(75) Inventors: Roger Michael Callahan, Charlotte, NC (US); Martin William Ericson, Jr., Concord, NC (US)

(73) Assignee: Bank of America Corporation, Charlotte, NC (US)

( * ) Notice: Subject to any disclaimer, the term of this patent is extended or adjusted under 35 U.S.C. 154(b) by 1597 days.

(21) Appl. No.: 10/232,115

(22) Filed: Aug. 30, 2002

(65) Prior Publication Data
US 2003/0229525 A1      Dec. 11, 2003

Related U.S. Application Data

(60) Provisional application No. 60/387,371, filed on Jun. 10, 2002.

(51) Int. Cl.
*G06F 9/46* (2006.01)
(52) U.S. Cl. .............................................. 705/8; 705/1
(58) Field of Classification Search ..................... 705/1, 705/8
See application file for complete search history.

(56) References Cited

U.S. PATENT DOCUMENTS

| | | | | |
|---|---|---|---|---|
| 6,782,421 B1 * | 8/2004 | Soles et al. | ................. | 709/223 |
| 7,305,351 B1 * | 12/2007 | Bechhofer et al. | ............. | 705/7 |
| 2002/0042687 A1 * | 4/2002 | Tracy et al. | ................. | 702/119 |
| 2002/0059093 A1 * | 5/2002 | Barton et al. | ................. | 705/10 |
| 2002/0120642 A1 * | 8/2002 | Fetherston | .................. | 707/500 |
| 2003/0153991 A1 * | 8/2003 | Visser et al. | .................. | 700/79 |
| 2003/0158800 A1 * | 8/2003 | Pisello et al. | ................. | 705/35 |

OTHER PUBLICATIONS

Kim, Henry M. and Fox, Mark S. Using Enterprise Reference Models for Automated ISO 9000 Compliance Evaluation. Proceedings of the 35th Annual Hawaii International Conference on System Sciences. 2002 IEEE.*
Alberts, Christopher J. and Dorofee, Audrey J. OCTAVE Criteria, Version 2.0 Dec. 2001 Technical Report CMU/SEI 2001-TR-016.*
Alberts, Christopher J., Dorofee, Audrey J. and Allen, Julia H. OCTAVE Catalog of Practices, Version 2.0 Oct. 2001.*
MacHarg, Marcia. Making the case for legal compliance audits. International Financial Law Review v16n4 pp. 9 Apr. 1997.*
Pannkuk, Lois and Bauman, Dodie Avoiding the perils of noncompliance. ABA Bank Compliance v22n5 pp. 40-52 May/Jun. 2001.*

* cited by examiner

*Primary Examiner*—Johnna R Loftis
(74) *Attorney, Agent, or Firm*—Michael A. Springs; Moore & Van Allen PLLC

(57) ABSTRACT

System and methods for integrated compliance monitoring. Various application modules work together to accomplish risk assessment and compliance monitoring. A risk assessment module facilitates the development of risk ratings based on responses to a plurality of compliance-related questions. The system can also include an action tracking module, and can further include a training module and a self-assessment module to determine individual compliance gaps. A common database is operatively connected to the modules to monitor the completion of assessments and to track actions based on remediation plans. In some embodiments, the invention is implemented via a computing platform or a collection of computing platforms interconnected by a network, such as a corporate intranet, in which case a web browser can facilitate use of the invention.

41 Claims, 23 Drawing Sheets

FIG. 14

Consultant List
Welcome: JOHN HAGE

This module is designed to help understand and manage information security risks.

Step 1: Add new GLBA Consultant by clicking the "Add GLBA Consultant" button.
Step 2: Once you've added GLBA Consultants, you may assign Business Units to consultants by clicking the "Assign BU" button.

| Run Report at this Level | Add GLBA Consultant (s) |
|---|---|

| GLBA Consultants | Assigned BU(s) | | |
|---|---|---|---|
| KELLY, MIKE | 2 | | Assign BU(s) |
| HESTER, BARRY | 0 | Delete | Assign BU(s) |

Download Adobe Acrobat Reader
(to print reports and assessments).

Logout
Help 1400
1402

FIG. 15

Consultant List: Consultant Detail
GLBA Consultant: KELLY, MIKE

This module is designed to help understand and manage information security risks.
Step 1: Click one of the available Business Units below (blue link) to create a team.

As a CIS Administrator, you may assign Business Units or re-assign existing Business Units designated to this consultant.

Assigned Business Unit(s)

| Check all that Apply | Responsible BU(s) | Run Report at this Level | Assign BU (s) | |
|---|---|---|---|---|
| | | BU Executive | # of Teams | # of Assessments |
| ☐ | CORPORATE STAFF AND SUPPORT/A | WILSON, WAYNE | 0 | 0 | Delete |
| ☐ | TECHNOLOGY AND OPERATIONS/F | BASINGER, JOHN | 0 | 0 | Delete |

Check All
Clear All

Re-Assign

Download Adobe Acrobat Reader
(to print reports and assessments).

Logout  Help

Consultant Detail
Welcome:MIKE KELLY
GLBA Consultant: KELLY, MIKE

This module is designed to help understand and manage information security risks
Step 1: Click one of the available Business Units below (blue link) to create a team.

Assigned Business Unit(s)

| Responsible BU(s) | BU Executive | # of Teams | # of Assessments |
|---|---|---|---|
| CORPORATE STAFF AND SUPPORT/A | WILSON, WAYNE | 0 | 0 |
| TECHNOLOGY AND OPERATIONS/F | BASINGER, JOHN | 0 | 0 |

Run Report at this Level

Download Adobe Acrobat Reader
(to print reports and assessments).

1600
1602
Logout
Help

Welcome:Team Detail

From this page, you may create teams on the "Team List" tab as well as create assessments on the "Assessment List" tab. Click on the appropriate tab to get started.

Step 1: Define Team scope.
Step 2: Click the "Add Team Members" Button.
Step 3: Click the "Add Data Guardian" Button.
Step 4: Click on "Assessment List" Tab.
Step 5: Click on "Create Assessment" Button.

▷ Team Contacts — 1704

| TEAM LIST | Assessment List |

1702

Select team leads and team members below by clicking the corresponding buttons. To select Data Guardians, click the "Add Data Guardian" button.

Team Name: Team 1
Team lead: CRUTCHFIELD, AMY (555) 555-6453    Team Scope: Assess Eastern Operations Save — 1706

Add Team Member — 1708

Team Management

| Member Name | Contact Information |

Add Data Guardian

Assigned Data Guardian(s)

| Data Guardian Name | Contact Information | # of Assigned Assessments | |
|---|---|---|---|
| RYMER, DAN | (555) 555-6453 | 0 | Delete |

Welcome:Team Detail: Assessment Settings

Assessment Assignment Instructions

Step 1: Select Assessment Type
Step 2: Select Assessor
Step 3: Assign Completion Data
Step 4: Select Data Guardian
Step 5: Save Select Assessment Type
[Business Unit ▷]

Name the Assessment:
[North Carolina]

Start Date  [▦] 5/31/2002
Due Date   [▦] 7/30/2002

Assign Assessment
Assessor: KINNEY, MATT [Assign Assessor]

Designate Data Guardian
[RYMER, DAN ▷]

[Save] [Cancel]

[Help] ← 1800

Welcome: Assessment Detail                                              Logout

1902 ▷ Assessment Contacts                                              Help

| ASSESSMENT | Remediation Plan |                    1904  Print Assessment

Respond to each question below by clicking on the "Answer" button. Clicking the "Answer" button will launch an answer wizard that will allow you to enter specific information and rate the risk level. Once your answer is complete, you may edit your response by clicking the "Edit" button. When you are finished, click "done" on the last question's answer wizard.

Business Unit                    | 5 questions unanswered.         North Carolina Edit  Overview Questions(s)
Q. Briefly describe the consumer customer related services provided by the unit.
A. Handling all functions within the state of NC Q. Information for approximately how many consumer customers is maintained, processed, or is accessible by this business unit?
A. 100,000 - 999,999

Q. What type of consumer customer information is used by the business unit?
A. Name, Address, Phone Number, Social Security Number, Account Number(s).

Q. Is consumer customer information processed by this business unit shared with any third party service providers? (If yes, review Third Party Service Provider Population Document available from your GLBA Business Unit Team Lead. List below any Third Party Service Provider not included on that Population Document and escalate to your GLBA Business Unit Team Lead.)
A. No

FIG. 19B

1908 [Edit]

1. Lack of Policies/Procedures        Risk Rating: 2.00/High  1912
                                                    R:1 P:3 I:2

Q. Have Corporate Information Security Standards and Privacy Guidelines been adopted and are documented procedures in place to safeguard the confidentiality, security and accuracy of consumer customer information? Corporate Information Security Standards include Accountability, Authentication, Authorization, Availability, Awareness, Confidentiality, Integrity and Physical Security. Privacy Guidelines include Accuracy and Access to Customer Information, Alliance and Affiliations, Contractual Agreements, Direct Marketing Preferences, Electronic Communications and Service Provider Guidelines.

A. No

Comments     Areas is unaware of corporate standards.
Remediation  Workgroup assigned to implement corporate standards and set up awareness program.

[Edit]

2. Information Compromise through Lack of Awareness    Risk Rating :1.67/High   1909
                                                                    R:1 P:2 I:2

Q. Do all Associates receive on-going privacy and information security awareness training?
A. NO Comments     Did something a couple of years ago - games on computer. Should do more.
Remediation  Set up semi-annual training program.

FIG. 19C

3. Compromise through Physical Access

Q. Are appropriate physical access controls in place and monitored to protect consumer customer information? (E.g., alarms, guards, security cameras, access cards, magnetic locks, visitor procedures, etc.)

Answer — 1906

4. Compromise through Unsecured Workstation

Q. Is access through workstation devices protected when not in use (e.g., during breaks or non-working hours, whenever associate is away from workstation)?

Answer

5. Compromise through Stolen Laptop

Q. Are laptops containing consumer customer information protected by password protection or other safeguards?

Answer

6. Compromise through Improper Archiving/Disposal Practices

Q. Are proper archiving and disposal practices followed for documents or other media containing consumer customer information?

Answer

7. Lack of Business Continuity Preparedness

Q. Are business continuity plans to protect and recover consumer customer information in place and are they periodically tested? (Indicate date of last test in Comments.)

Answer

Proceed to Remediation Plan — 1910

FIG. 20

▷ Assessment Contacts
| ASSESSMENT | Remediation Plan |

Read the question below and enter the controls you currently have in place, comments regarding this risk rating of the risk and details of the remediation plan and answer any other questions. When you are finished with this question, click "Next" to progress to the next question on the assessment. Use the "Previous" button to return to a previous question. To return to the entry page without saving, click "Cancel". To save and exit, click the "Done" button.

Business Unit — 5 questions unanswered — North Carolina

| 1 of 7 | Lack of Policies Procedure | Risk Rating: 2.00 /High |

Have Corporate Information Security Standards and Privacy Guidelines been adopted and are documented procedures in place to safeguard the confidentiality, security and accuracy of consumer customer Information? Corporate Information Security Standards include Accountability, Authentication, Authorization, Availability, Awareness, Confidentiality, Integrity and Physical Security. Privacy Guidelines include Accuracy and Access to Customer Information, Alliances and Afflictions, Contractual Agreements, Direct Marketing Preferences, Electronic Communications and Service Provider Residual Risk
◉ 1 High
○ 2
○ 3 Med
○ 4
○ 5 Low Probability           Impact
○ 1 High              ○ 1 High
○ 2                   ◉ 2
◉ 3 Med               ○ 3 Med
○ 4                   ○ 4
○ 5 Low               ○ 5 Low Are these controls sufficient?
○ Yes ◉ No Guidelines:
○ Yes ◉ No ○ No Controls:

Remediation Comment:
Workgroup assigned to implement corporate standards and set up awareness program.

Comments:
Areas is unaware of corporate standards.

| Cancel | Done | Previous | Next |

FIG. 21

Welcome: Assessment Detail                    2100          [Logout]

▷ Assessment Contacts                                        [Help]

| Assessment | REMEDIATION PLAN |

Complete the following remediation plan details. When you are finished, click the "Save Plan" button at the bottom of the page.

| Integration Statement/Description |

| Set up Standards Awareness and Training workgroup. △ ▽ | [Save] |

Plan Contact: None Assigned [Assign]                         2101

| Set Remediation Plan Timeline |

[□] Target Start Date       [Not Assigned]   [□] Actual Start Date      [Not Assigned]
[□] Target Completion Date  [Not Assigned]   [□] Actual Completion Date [Not Assigned]

| Review Threats Assessed |

1. Lack of Policies /Procedures                Risk Rating: 2.00 /High
                                               R: 1 P:3 I:2

| Remediation Workgroup assigned to implement corporate standards and set up awareness program |

2. Information Compromise through Lack of Awareness    Risk Rating: 1.67 /High
2102                                                   R: 1 P:2 I:2

| Remediation Set up semi-annual training program. |

| Remediation Action (For Guardian use Only) |
○ Do Not Implement  ○ Implement

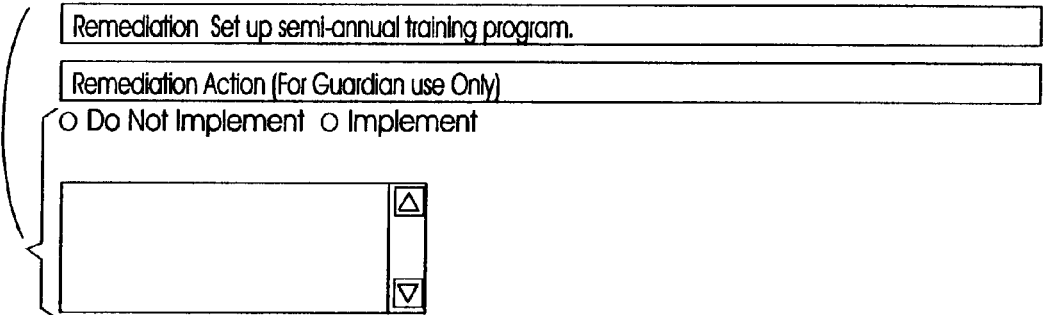

| Post Approval Documentation |

[Choose a ▽] % Complete

Results:

[         △
          ▽ ]   [Save]

SYSTEM AND METHODS FOR INTEGRATED COMPLIANCE MONITORING

CROSS-REFERENCE TO RELATED APPLICATION

This application claims priority from commonly owned, co-pending provisional patent application Ser. No. 60/387,371, filed Jun. 10, 2002, the entire disclosure of which is incorporated herein by reference.

BACKGROUND

Today, many businesses must comply with various policies, regulations, and guidelines, whether established internally, by a regulatory entity, or as a result of legislation. One example is the increasing privacy-related regulations that must be complied with by businesses. Recent U.S. national laws, for example, the Gramm-Leach-Bliley Act (GLBA) and the Health Insurance Portability and Accountability Act of 1996, provide for regulations which require that risk assessment and management controls be implemented across an enterprise in a consistent manner to protect consumer personal information. The regulations implementing the GLBA, for example, can be found at 12 C.F.R. part 30 et al. and are incorporated herein by reference. Because these regulations place responsibility on the Board of Directors of many institutions for overseeing consistent compliance, there is an increasing need for a comprehensive governance process to assure the compliance and visibility into the status of compliance efforts across an entire business organization. For very large and geographically diverse organizations, these requirements can create a significant challenge and resource expenditure.

Historically, efforts to accomplish risk assessment and compliance monitoring have centered around separate systems without readily available and current enterprise activity reporting that tracks compliance across an enterprise. Additionally, compliance testing can at times uncover areas where improvements or remedial actions must be implemented. Generally, these efforts can lack currency and are sometimes not adequately monitored and tracked over time to demonstrate continuous improvements within the enterprise. Therefore, there is a need for an integrated process and system for efficiently accomplishing and monitoring enterprise risk assessments and providing management with consistent compliance monitoring.

SUMMARY

This invention provides for business governance processes and tools to accomplish training, risk assessments, compliance assessments, approvals and remediation action tracking to facilitate compliance monitoring within an organization. In some embodiments, the invention is most attractive to organizations where policies, regulations, and guidelines are implemented across a large enterprise by multiple business units or divisions but compliance is monitored through a central governance and reporting process. However, the principles of the invention can be applied in much smaller businesses, as well as to non-profit, volunteer and educational organizations of any size. While the context in which the disclosed embodiments are discussed suggests compliance with legal or regulatory requirements, the invention can be equally well adapted to any other type of compliance, including compliance with internal policies, or the policies of non-governmental organizations such as trade associations or accrediting agencies.

In some embodiments the integrated compliance monitoring system of the invention includes various modules, applications, or "application modules" that work together to accomplish risk assessment and compliance monitoring. These can be implemented by a computer system or systems, software, and networks, or by other means, such as paper-based means. In some embodiments a risk assessment module facilitates the development of risk ratings based on responses to a plurality of compliance-related questions. A common database and an action tracking module are operatively connected to the risk assessment module to track actions based on remediation plans associated with the responses to at least some of the plurality of compliance-related questions. The system can further include a training module and a self-assessment module to determine individual compliance gaps.

In some embodiments compliance monitoring begins (in some cases after training via a training module) by performing a risk assessment. The risk assessment process implemented by a risk assessment module includes collecting a plurality of responses to a plurality of compliance-related questions. A risk rating is established for each question based at least in part on the response, which may include intermediate numerical values characterizing various aspects of the risk. The risk rating expresses a compliance risk associated with a question and the response to the question. An assessment is produced which includes the responses and risk ratings. An overall risk rating can be calculated and becomes part of the assessment.

The assessment typically will require an approval by an appropriate level of management or executive. An intermediate review may also be included in the process. If the risk rating for a question is too high, usually meaning adequate controls or procedures are not in place relative to the subject matter of the question, a remediation plan is required. In the case of a software implementation the recording of this remediation plan can be required programmatically. Assessments with remediation plans are then tracked, in some embodiments via an action tracking module, so that the status of the remediation plans can be monitored by the organizations.

In some embodiments, the invention is implemented via a computing platform or a collection of computing platforms interconnected by a network, such as a corporate intranet, in which case a web browser can facilitate use of the invention. A computer program product or products containing computer programs with various instructions cause the hardware to carry out, at least in part, the methods of the invention. Applications, or modules, such as the previously mentioned risk assessment module are operated on a server or workstation. If the applications are running on a server, users access the modules from a client workstation. In the case of the risk assessment module, tailored, risk assessment templates can also be stored on the server or workstation. A database is operatively connected to the modules. The database can reside on the same platform as one or more of the application modules, but more typically will reside on a database server. The database facilitates review, approval and action tracking related to the assessment. In this computer-based embodiment, the hardware and software together form the means for carrying out the invention.

BRIEF DESCRIPTION OF THE DRAWINGS

FIGS. 14-21 are further example screen shots that might be encountered by a user of a computer implemented embodiment of the invention. FIG. 19 is presented in parts designated 19A, 19B, and 19C.

DETAILED DESCRIPTION OF ONE OR MORE EXAMPLE EMBODIMENT(S)

Figure 1:
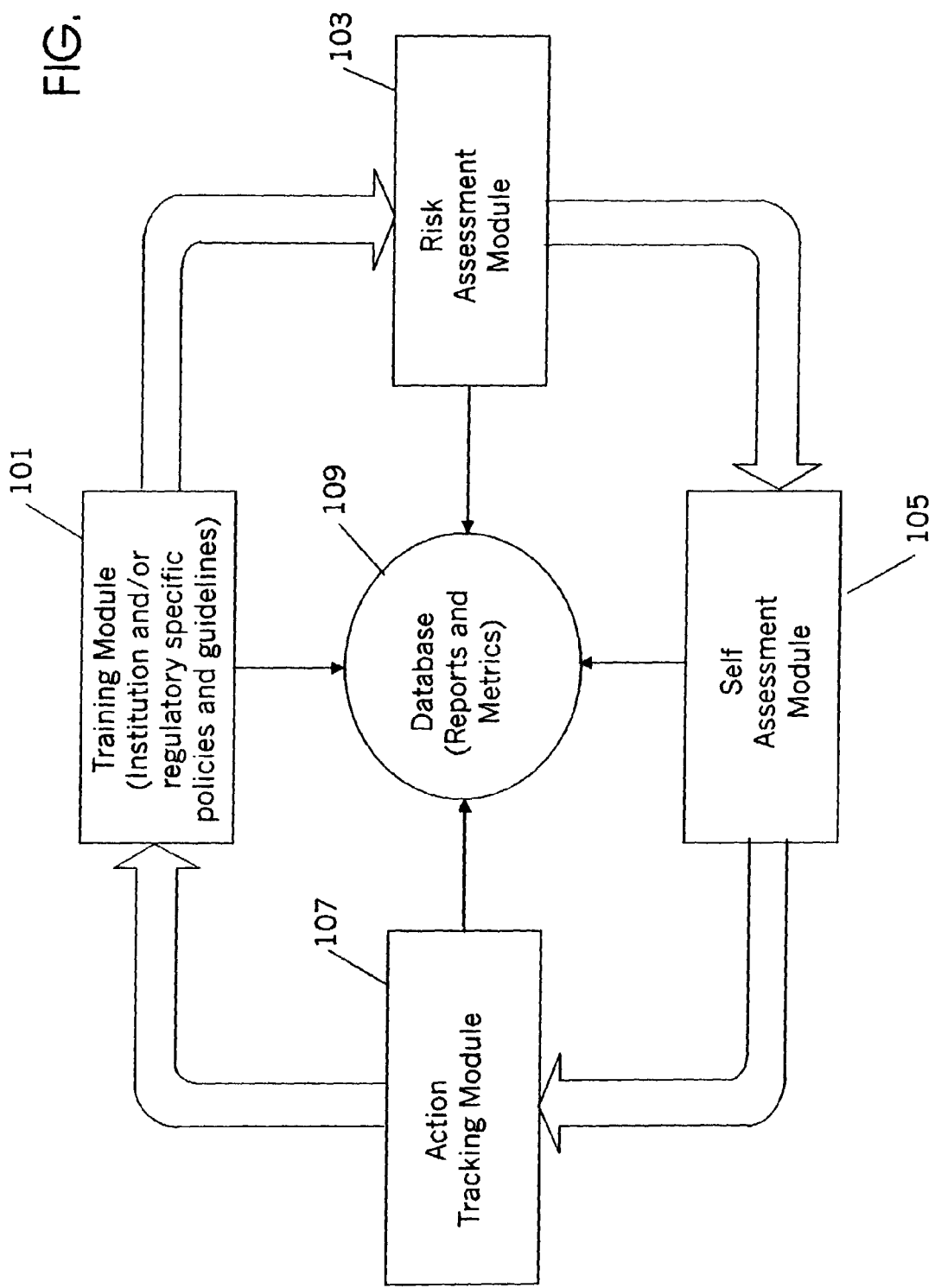
FIG. 1 is a block diagram schematically representing the various modules in one embodiment of the invention and how they are connected to a common database.

The present invention can most readily be understood by considering the detailed embodiments presented herein. Some of these embodiments are presented in the context of an a large enterprise using a corporate intranet to facilitate the carrying out of assessments and compliance monitoring, however, these embodiments are examples only. Also, particularly with respect to screen shots, the embodiments are sometimes disclosed in the context of a financial organization monitoring compliance with the GLBA. It cannot be overemphasized that the invention has applicability to any type of compliance monitoring in any type of organization.

Some terms used throughout this description should be understood from the beginning. The term "enterprise" typically is being used to refer to a legal entity such as a company or association that is making use of the invention. The company can be large or small. A "business unit" generally refers to a division of business organization within an enterprise. An "executive" is a person who has authority to approve and direct the activities related to compliance on behalf of an enterprise, either for the enterprise as a whole, or for a business unit. An approver is a person who has authority to give approval of risk assessments and plans for achieving and monitoring compliance in an organization. An approver will often be an executive, but not necessarily. A "reviewer" is an individual who reviews assessments and compliance plans prior to approval. A reviewer is optional. The reviewer may be referred to herein as a "data guardian" and may in some cases also be an approver.

In some cases a team of people may be put in place to perform an assessment. This team may include, for example, not only the actual assessor or assessors, but also consultants. In cases where such a team is used, the team leader assembles the team using databases and personnel information as needed. The leader is sometimes referred to herein as a "team lead."

The terms, "module", "application module", and in some cases, simply "application" are meant to refer to a specific process that is performed as part of the compliance monitoring discussed throughout. Often a module corresponds to a software application. Some modules are for performing risk assessments in which an assessor provides a response for each of a series of questions. The term "response" simply refers to information that is provided in response to a question. It may be an answer to the question, comments, supplemental information of some kind, an indication that the question is not applicable, or any combination of the above. A risk rating is an indication of how much risk of non-compliance is indicated based on a response or group of responses. Although a risk rating is typically on a numerical scale, it could also be a binary indication, such as high/low or acceptable/unacceptable. Other terms will either be discussed when introduced, or other-wise should be assumed to have the conventional meaning as understood by per-sons of ordinary skill in the art.

FIG. 1 is a high-level block diagram depiction of the modules of an integrated compliance process system (ICPS) according to some embodiments of the invention. In this example, the ICPS encompasses modules for training responsible employees on the compliance requirements, 101, performing risk assessment and management tasks associate with risk assessment, 103, and accomplishing self assessments to permit business to measure their level of compliance, 105. Areas identified as compliance shortfalls, through the self-compliance process or any other evaluative source, such as audits or other testing can be tracked in an action tracking module, 107, which may be integrated and linked to a business unit. The results of each of these processes feed a common database, 109, for compliance demonstration and reporting. This entire process can be administered in at least some embodiments by an enterprise compliance officer, who establishes the appropriate reporting level authorities for the enterprise, oversees the authority to enter and track issues, and can provide the reports necessary to support the governance process or regulatory compliance posture.

Figure 2:
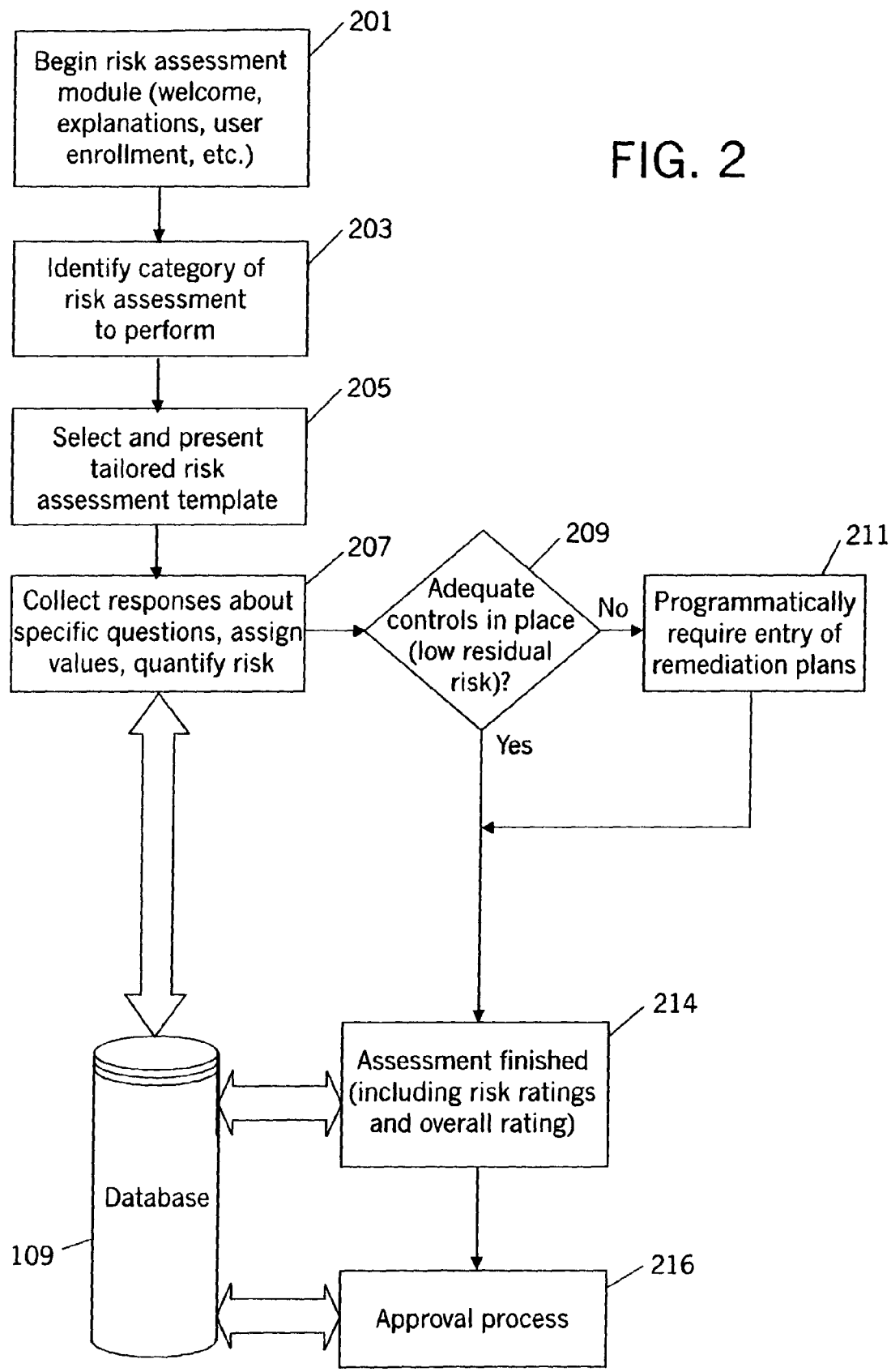
FIG. 2 is a flowchart illustrating the operation of the risk assessment module according to one embodiment of the invention.

FIG. 2 illustrates the process associated with the risk assessment module. There is a background phase, before the actual process begins, dealing with defining participants who have certain roles at various stages of the process. Typically, in a large enterprise an organization within the enterprise such as an information security organization will make a high-level content review of other areas of the enterprise to determine if an area appears to need to come under assessment. The risk assessment module as illustrated in FIG. 2 potentially provides a way for the enterprise to Identify perceivable threats, evaluate the likelihood of those threats, consider the damage that could occur from those threats, and look at policies, procedures. In some cases, recording and documenting remediation plans and actions is required if the policies and procedures are inadequate to achieve a sufficiently low risk rating for a question, in other words, if controls are insufficient to ensure compliance in an area represented by the question, based on the response to the question.

The process starts at 201. This step consists of gathering enrolling information and may include developing an understanding of the organization. If a team is being set up by a team lead or administrator, that person may need to look at areas that deal with matters that require compliance monitoring, for example, consumer customer information in the case of the GLBA. Additional specific roles might be identified for this process, for example, the executive, consultants, risk assessors (a person who would actually answer assessment questions), and one or more reviewers or "data guardians." Each person on the team is enrolled by the person immediately above him/her in the hierarchy. Everyone who signs onto the system receives a screen, which is a welcome screen and is tailored to give the person what is needed to exercise that person's role.

At step 203, a category of risk assessment to perform is identified and selected. Specific assessments are established and preprogrammed for selection at this step. As an example, a financial business doing an assessment for the GLBA, or some other consumer privacy guidelines, might have the following types of assessments available:

Third-Party Service Provider—A business unit may have relationships with multiple third-party service providers. The organization may need to take into account the ability of those providers to protect information just as much as if the enterprise held the information itself. This assessment is tailored to third-party service providers, emphasizing those that have access to or who manipulate, store, transmit or destroy the company's consumer customer information. Within this process, business units might be asked to provide a population of all third-party service providers and risk-rank them on the basis of the type of data shared between the financial services company and the provider.

Application Software—This assessment reviews the controls within applications and the development of applications (other than those connected with the present invention). The assessment is done to ensure data is properly secured. It will often include software that the enterprise does not own.

Technology Infrastructure—This assessment would tend to be done for a centrally managed technology infrastructure. A business unit may make use of the corporate intranet or may use the corporate wide-area network (WAN). Some of this type of assessments might be handled centrally. For those portions of the company that are less centralized and currently handle their own infrastructure, a business unit specific technology infrastructure assessment my be performed.

Business Unit Risk Assessment—This type of assessment covers policy and procedures within a business unit in the enterprise. It is more of a "people" assessment than the other assessments mentioned so far.

Typically, business units in a large enterprise would be asked to evaluate their overall business model and conduct assessments at a level where they can speak to common processes and commonality of monitoring and understanding of the control structure. Thus, a business unit may desire to perform an assessment along regional lines. The invention is designed to be sufficiently flexible to handle assessments at whatever level a business unit or the enterprise wants. Typically, executives, administrators, or other senior managers will receive a summary of information obtained in an assessment and will be able to drill down to whatever level of detail they want.

At step 205 the system picks the appropriate tailored risk assessment template or templates to perform the type of assessment selected at step 203. A template includes the questions and supporting information necessary to perform the specific type of assessment. The assessor normally will answer the questions, document the reasoning behind the answers, and eventually produce a risk rating by evaluating on a presented scale how well controls are fashioned to address the threats and potential damage that are invoked by each question. All of this work is performed at the assessor "level" within the process, and the system collects all of this information at step 207. In at least one embodiment, this takes place via the World Wide Web and is computer-based. Further details of the computer system implementation will be discussed later in relation to the network diagrams and screenshots presented in this disclosure.

At step 209, a determination is made for each question whether adequate controls are in place, and/or the risk rating is low, or at least satisfactory in a given context. If not, a remediation plan is required at step 211 before an assessor can exit or continue. The user is prevented from leaving this blank, in the case of computer software, programmatically or by the program's function. In either case, the assessment is completed at step 214. This may include the calculation of an overall risk rating for the assessment, in which risk ratings for all the questions are combined, possibly by averaging or weighted averaging. An approval process follows at step 216. In a large organization, this approval process may include the presentation of the assessment to a reviewer or "data guardian" who provides more of a strategic view to what is presented. The data guardian can then escalate the entire information package and obtains a sign-off from the approver, possibly a business unit or enterprise executive. Options at this point are for the approver to accept the assessment including remediation plans put forth; or note that remediation is not planned, and accept the risk. If the latter is selected, the reasoning for the decision can be included. Remediation plans may include, for example, upgrading systems, training, or combinations of the two.

Note that the common database is shown at 109. This database is continually accessed and updated throughout an assessment. It is schematically shown as being accessed during the collection of information, the completion of the assessment and the approval process. However, it may also be accessed at any other step. Additional access indications are not shown for clarity.

Figure 3:
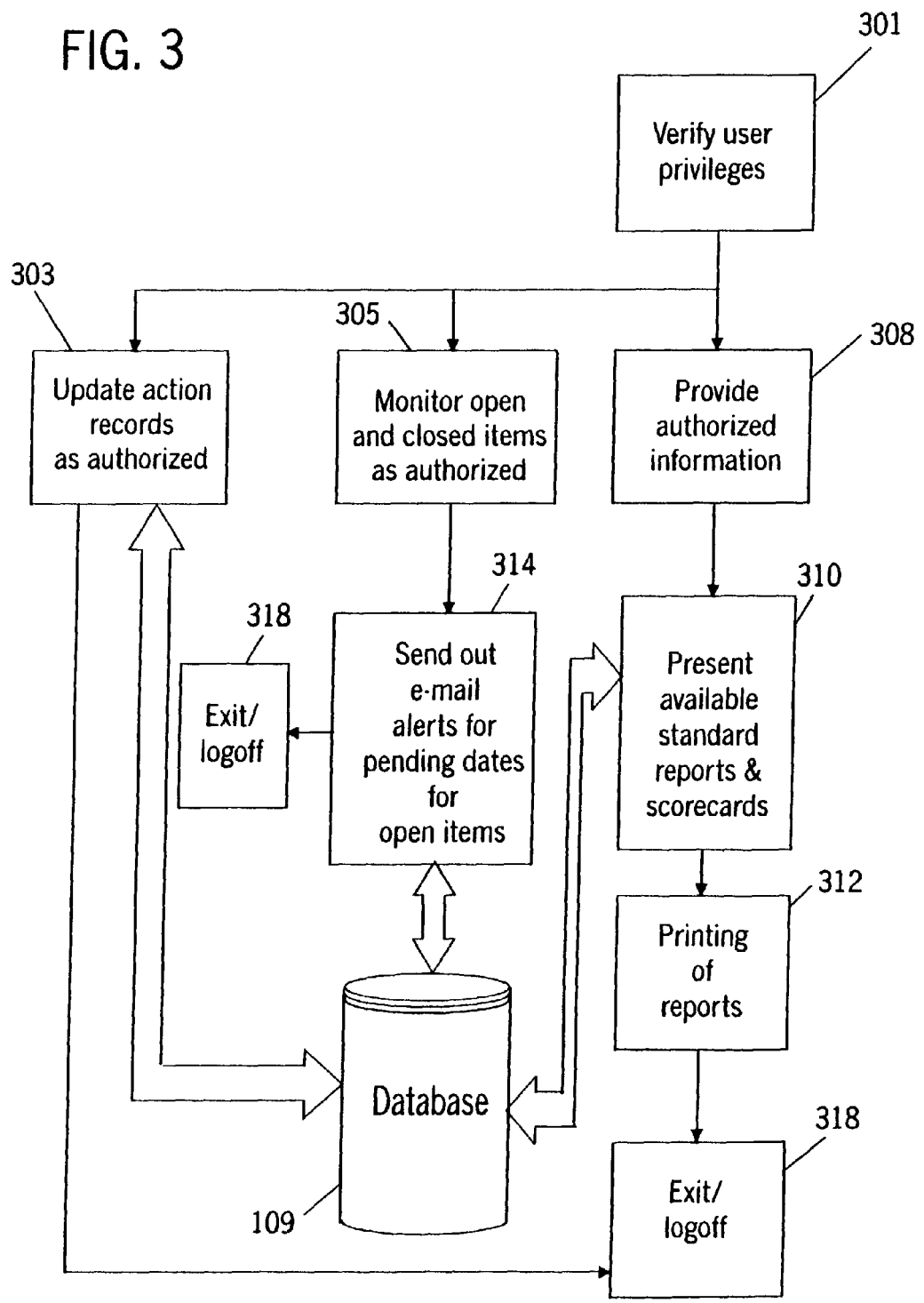
FIG. 3 is a flowchart illustrating the operation of the action tracking module according to one embodiment of the invention.

Action tracking by an action tracking module, as shown in FIG. 3, can be initiated if the enterprise is not totally compliant, or there are areas where improvement is needed. The common database facilitates action tracking. Action tracking can be based on either a risk assessment or self-assessment (discussed below). In a large enterprise, gaps or unusual compliance risks can be identified as they affect the business unit in which they were identified, and also across the enterprise to determine if patterns exist.

At step 301, a user initially logs in. Since only those who are already familiar with the system would normally be tracking actions, much of the initial welcomes, explanations, etc. can be skipped for this module. At this point, the fact that the user has access to the system is verified, typically by a user ID and password scheme. From this point, the user can initiate any of three different tasks. The user can simply update records as authorized for assessments she or he is responsible for at step 303, view open and closed items for assessments she or he is responsible for as authorized at 305, or view a broader range of information as authorized at step 308. At step 308, a person wishing to utilize this portion of the module is located in the corporate hierarchy and authorization assigned by the system administrator is verified. This reporting, for example, can be used to show an executive at any level the view of everything for those who report to that executive. In this case, standard reports and/or "scorecards" are presented at step 310. Some of the scorecards might include, for example, a percent of associates who have taken information security training within the past 12 months and have passed it, which provides a view of training issues related to compliance. An executive might look at the results of a risk assessment and ask if his or her area of responsibility is moving toward a less risky profile. As another example, a report on a technology infrastructure assessment might deal with assessments that show how many servers in an area are current on their patch revision and how many need action. Reports and scorecards can be printed at step 312.

Step 305 is a part of the process deals with items that have been identified through the risk assessment and self-assessment processes as needing remediation. This step can provide some idea of what remediation items are open, those items progressing toward completion, and proposed items, both for accomplishment and an understanding of the current environment. In a large enterprise, this step can also be designed to provide an ability to review corporate best practice, so a participant is not presented with a problem with no idea of how to fix it. The process, itself, can generate Email alerts for key events at step 314. Note that the database, 109, is tied into all of these subprocesses. Key links are shown, others are omitted for clarity. A user exits or "logs off" of the action tracking module at step 318.

Figure 4:
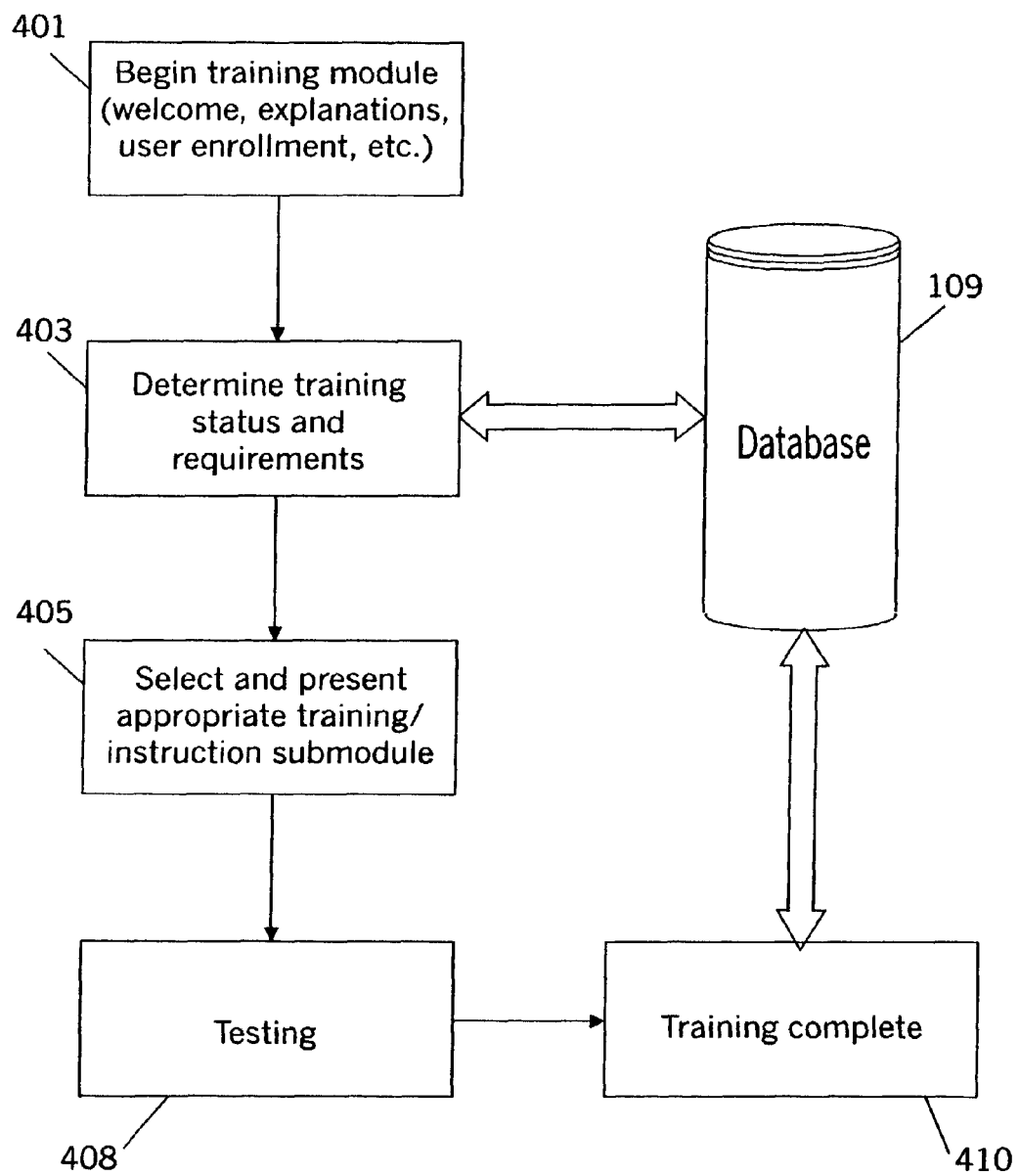
FIG. 4 is a flowchart illustrating the operation of the training module according to one embodiment of the invention.

The training module flowchart of FIG. 4 begins at step 401 with user enrollment, welcome screens, etc. At step 403, training status and current requirements are determined, again by referring to the common database, 109. At step 405, the appropriate training submodule is selected based on the information gathered at step 403. After the training is completed, a test can be administered at step 408. This test could be written in a paper-based system, but would more likely be computerized. The training completion information, test results, etc. are all assembled at step 410, and the process ends. Note again, the database is kept updated as shown by the exemplary links.

Figure 5:
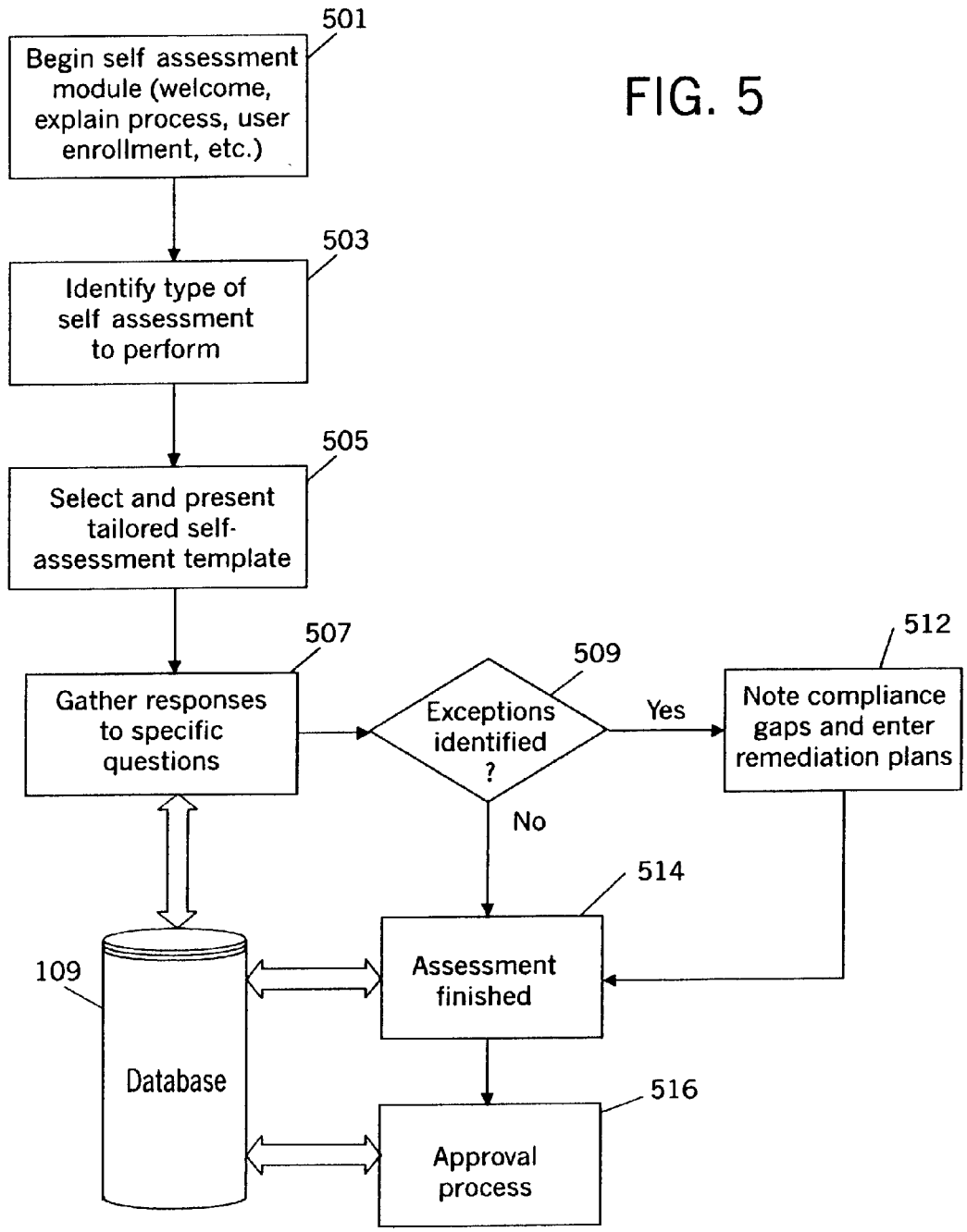
FIG. 5 is a flowchart illustrating the operation of the self assessment module according to one embodiment of the invention.

The self assessment module process of FIG. 5 is similar to the risk assessment module process of FIG. 2. Prospective users will complete enrollment information and information about an assessment type at steps 501 and 503 that allows the population of a template that will be presented at step 505 to be keyed to pre-defined self-assessment programs. Essentially, the self-assessment type will be keyed, at least in part, to job role. In some embodiments, self assessment templates will differ from risk assessment templates in that they allow a response choice of either "yes" or "no" to the various compliance-related questions at step 507. Each "no" represents an exception identified at step 509, and the self-assessor will be required to provide a remediation plan at step 512. The system can be set up so that these remediation plans can be tracked through the action tracking module in the same way that other remediation plans are tracked.

Another difference between risk assessment and self assessment in the example embodiments is that in the latter there is individual tracking. In risk assessment, the process deals with applications, third party service providers, technology infrastructure, and business unit components. Thus, gaps are elements of a broader remediation plan and it is even possible that one remediation plan covers the gaps on multiple risk assessments. In a typical embodiment, items covered in a self assessment will be items that can be readily complied with by most individuals, hence, no numerical "risk ratings" are established for each question. For example, if the compliance being monitored has to do with privacy and security of information, such as under the GLBA, the self assessment might include questions about locking files at night, changing passwords at regular intervals, etc. It would certainly be possible however, to include risk ratings on individual questions in self assessments if desired. An overall risk rating is based on the percentage of questions to which the desired answer is given. In any case, the self assessment is completed at step 514, and an approval process, often simply by immediate management, can be invoked at step 516. As before, interaction with the common database, 109, takes place often, and is shown at key steps in FIG. 5.

With regard to self-assessment, the number of participants may be extremely different, larger, than the number participating in risk assessment using the risk assessment module. However, once the "level" within a enterprise or business unit hierarchy is determined where self-assessments will be administered, the results can be reported in an aggregated fashion up the hierarchy with a risk rating assigned to each manager within that hierarchy. For example, if 20 persons took a self-assessment, and they report to four different managers, those managers not only would receive results of each of their reports' assessment, but all of their reports' assessment, aggregated to show the manager's assessment. And, if all four managers reported to the same manager up the hierarchy, that manager would be assigned a risk rating on the basis of those of his/her direct reports.

Figure 6:
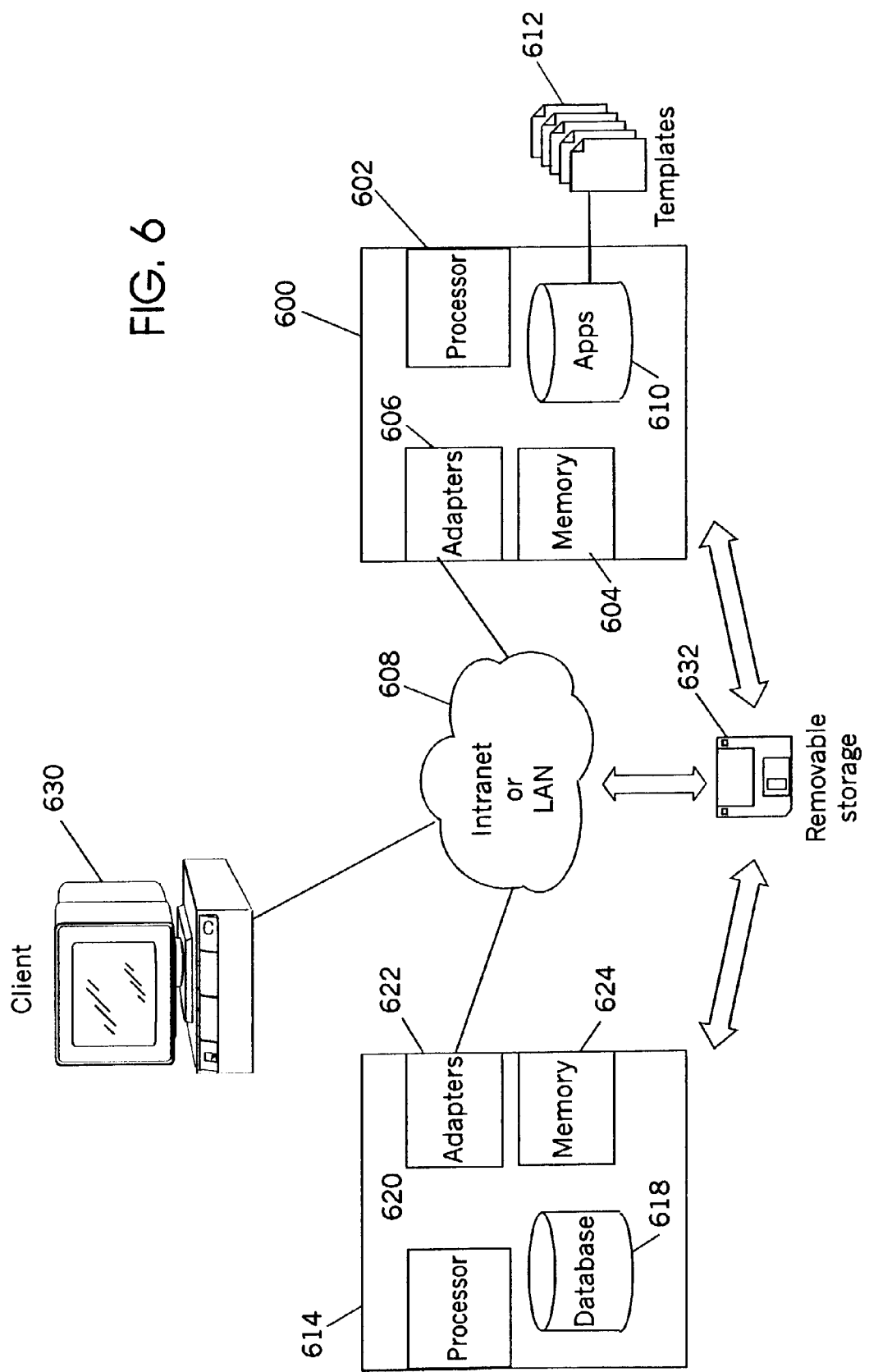
FIG. 6 is a close-up detail block diagram of some of the computing hardware that is used to implement some embodiments of the invention.
Figure 7:
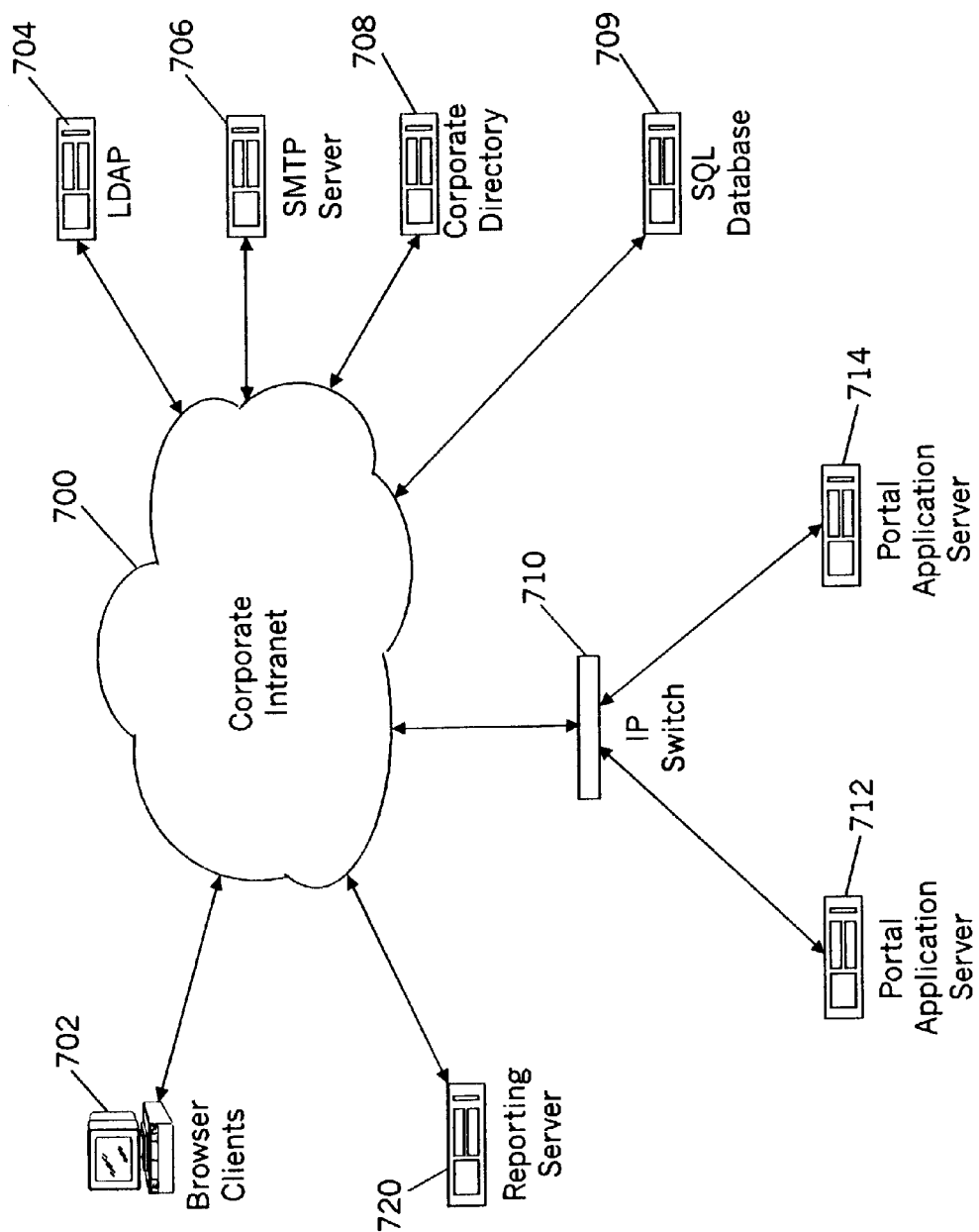
FIG. 7 is a network block diagram of the hardware used to implement the invention in an example embodiment suitable for use in a large enterprise.

FIG. 6 illustrates, in block diagram form, a close-up view of some of the hardware involved in carrying out a computer-implemented embodiment of the invention. FIG. 6 also shows how the invention might be implemented on a network in a small enterprise. A less detailed, but wider view of the components of a networked, on-line system that might be used in a larger enterprise is shown in FIG. 7, discussed below. FIG. 6 includes a computing platform, 600. The platform is controlled by a processor, 602, which serves as the central processing unit (CPU) for the platform. Memory 604 is typically divided into multiple types of memory or memory areas such as read-only memory (ROM), and random access memory (RAM). A plurality of general-purpose adapters, 606, are present. At least one, in this example, serves to connect the computing platform to a network 608. The network might be a corporate intranet, or simply a local area network (LAN). Computer program code instructions for implementing the appropriate application modules (Apps) are stored on the fixed disk, 610. Assessment templates, 612, are also stored in fixed storage. When the system is operating, the instructions are partially loaded into memory and executed by the CPU. Numerous types of general purpose computer systems and workstations are available and can be used to implement computing platform 600. Available systems include those that run operating systems such as Windows™ by Microsoft, various versions of UNIX™, various versions of Linux™, and various versions of Apple's Mac™ OS.

It must be noted that the entire function of the invention, including the common database can be implemented in whole or in part on a single computing platform like that shown in FIG. 6. This might be the case, for example, if a small business were to make use of the invention on a stand-alone personal computer. The invention can also be implemented partly or completely using paper-based means, in which case forms would replace the various computer entry steps and screens disclosed herein. In other embodiments, however, the common database would be stored on a database server such as an SQL server, as shown at 614 of FIG. 6. In this case, fixed disk storage, 618, contains the database. Processor 620, adapters 622, and memory 624 function similarly to those of computing platform 600. If a corporate intranet is used for connectivity, the applications or modules on computing platform 600 can be accessed from a client workstation 630, via a web page. With appropriate security protocols, the assessments and action tracking can also be accomplished remotely over the Internet.

In any case, a computer program which implements parts of the invention through the use of a system like that illustrated in FIG. 6 can take the form of a computer program product residing on a computer usable or computer readable storage medium. Such a medium, a diskette, is shown at 632 in FIG. 6. A computer program product containing the program of instructions can be supplied in such a form, and loaded on the machines involved, either directly, or over a network. The medium may also be a stream of information being retrieved when the computer program product is "downloaded" through the Internet. The computer programs can re-side on any medium that can contain, store, commu-nicate, propagate, or transport the program for use by or in connection with an instruction execution system, apparatus, or device. The computer-usable or computer-readable medium may be, for example but not limited to, an electronic, magnetic, optical, electromagnetic, infrared, or semiconduc-tor system, apparatus, device, or propagation medium. Other examples of the computer-readable medium would include an electrical connection having one or more wires, a portable computer diskette or portable fixed disk, an optical fiber, a compact disc read-only memory (CD-ROM), and a digital versatile disc read-only memory (DVD-ROM). Note that the computer-usable or computer-readable medium could even be paper or another suitable medium upon which the program is printed, as the' program can be electronically captured, via, for instance, optical scanning of the paper or other medium, then compiled, interpreted, or otherwise processed in a suit-able manner, if necessary, and then stored in a computer memory.

FIG. 7 illustrates a larger network infrastructure that can be used to implement example embodiments of the invention, for example, in a large corporate enterprise having a world-wide-web (WWW) enabled corporate intranet, 700. Browser clients 702 access the system via a client computing platform. A lightweight directory access protocol (LDAP) server 704 provides authentication when a user logs onto the ICPS. A commercial software product such as SiteMinder™ from Netegrity, Inc., can be used for this purpose. Simple mail transfer protocol (SMTP) server 706 is used to generate out-going notification E-mail messages at key stages of each process. A corporate directory server, 708, provides access to the company's master directory of employees (associates) and other information necessary when identifying/selecting actors for the ICPS. An internet protocol (IP) switch, 710, provides load-balancing to direct sessions to one of two appli-cation servers, 712 and 714. The switch will be run under the so-called "sticky on=yes" configuration, which assures that once a session is assigned to a portal application server com-puting platform, the session will continue to work in/from that portal until the session is completed.

In this example embodiment, the application servers run using Microsoft's Internet Information Services (IIS). These servers are the launch point for the process modules and will direct action back and forth among the other servers and databases. The common database which has been previously discussed relative to the flowcharts presented, is implemented on an SQL server shown at 709. The network of FIG. 7 also includes an IIS-based reporting server, 720, which handles report formats and similar tasks involved with operating the action tracking module. The reporting server has a stub on the application server that serves as an interface. The reporting server has the ability to schedule reports, such that the data is accessed during off hours during otherwise low utilization of the SQL server. The reporting server accumulates those reports in batch rather than real time.

The message flow diagrams which are illustrated in FIGS. 8-13 schematically illustrate some of the basic messaging that takes place in a network like that of FIG. 7 when the invention is in use. It is important to recognize that the message flows are not all-inclusive with respect to either the message flow scenarios presented, or the particular message elements included in a particular scenario. In the latter case, to include every message packet exchanged would adversely affect the clarity of the diagrams, and moreover, is not necessary since the basic operation of an IP-based network is generally under-stood by those skilled in the art. The purpose of these message flows is to portray the versatility of the invention in making use of distributed network resources such as databases, direc-tories, servers, clients, etc. in an integrated fashion.

Figure 8:
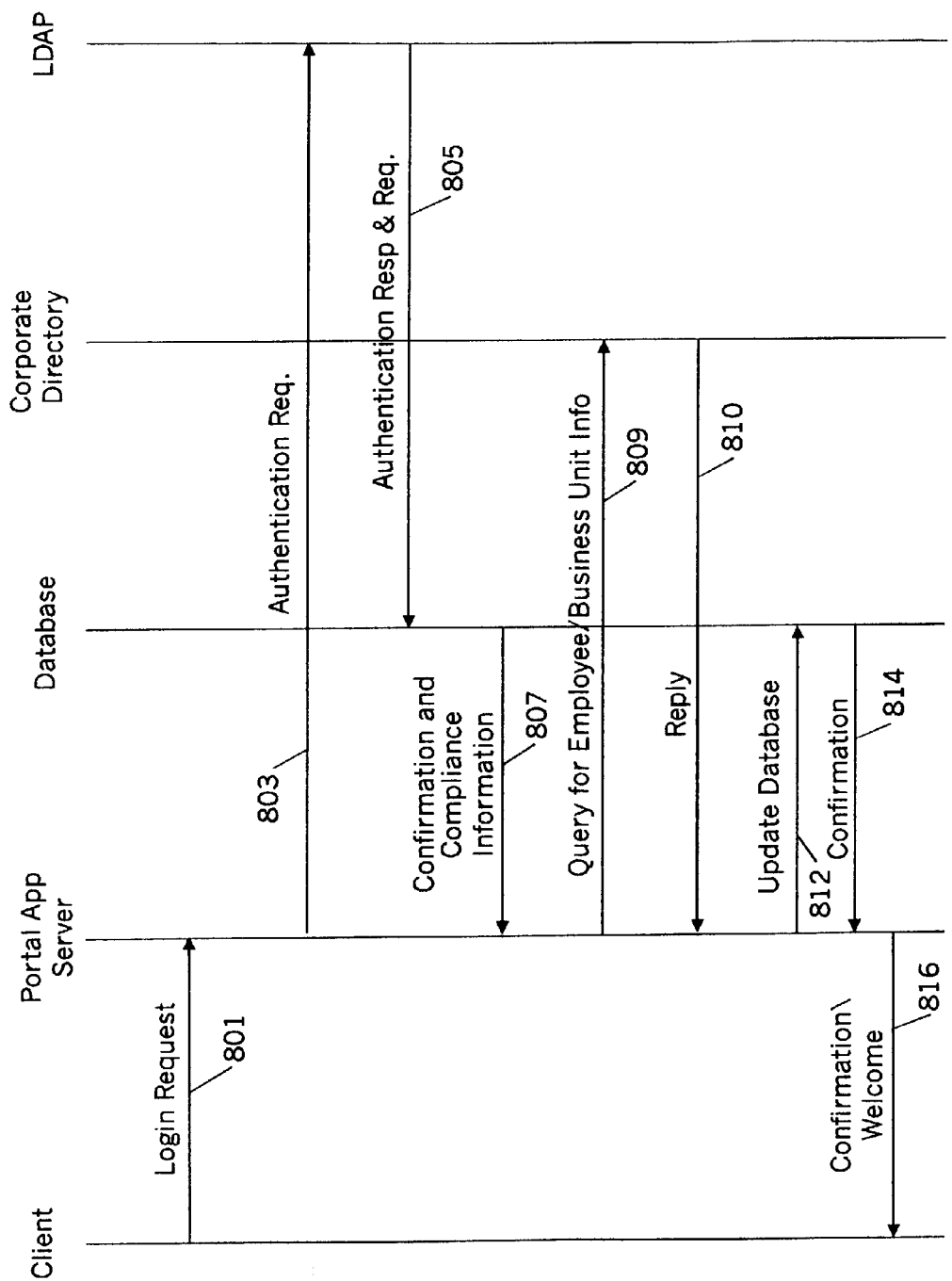
FIG. 8 is a message flow diagram illustrating some of the network activity taking place when the invention is in operation in a network like that of FIG. 7.

User login is illustrated in FIG. 8. In this example embodi-ment, users for any of the modules will log in using a similar procedure. The login procedure is independent of whatever action the user plans to take, or what role the user has. The login procedure is as follows. A login request, 801 is directed through the IP switch to one of the portal application servers. The app server directs the request to the LDAP server, for authentication, at 803, and the LDAP server affirms the user is who the user says he/she and forwards the request to the SQL database for authentication at 805, confirming the user is known to the ICPS system. Confirmation and information about the user is forwarded back to the app server at 807.

Next, a query is forwarded to the corporate directory at 809, where information about the user is obtained, as well as information about business units for which the user is han-dling any assessments. The type of employee information will be name, telephone number and possibly postal and Email addresses. For business units the information may be the business unit name, executive associated with that busi-ness unit, and hierarchy information. The information is included in a reply at 810, and the app server copies it to the SQL database at 812, where the information is stored. This operation is confirmed at 814, and a welcome screen is gen-erated for the user at 816, based on the user's role. From that welcome page, depending on the user's role, the user will be presented with assessments for which the user is responsible in some way.

Figure 9:
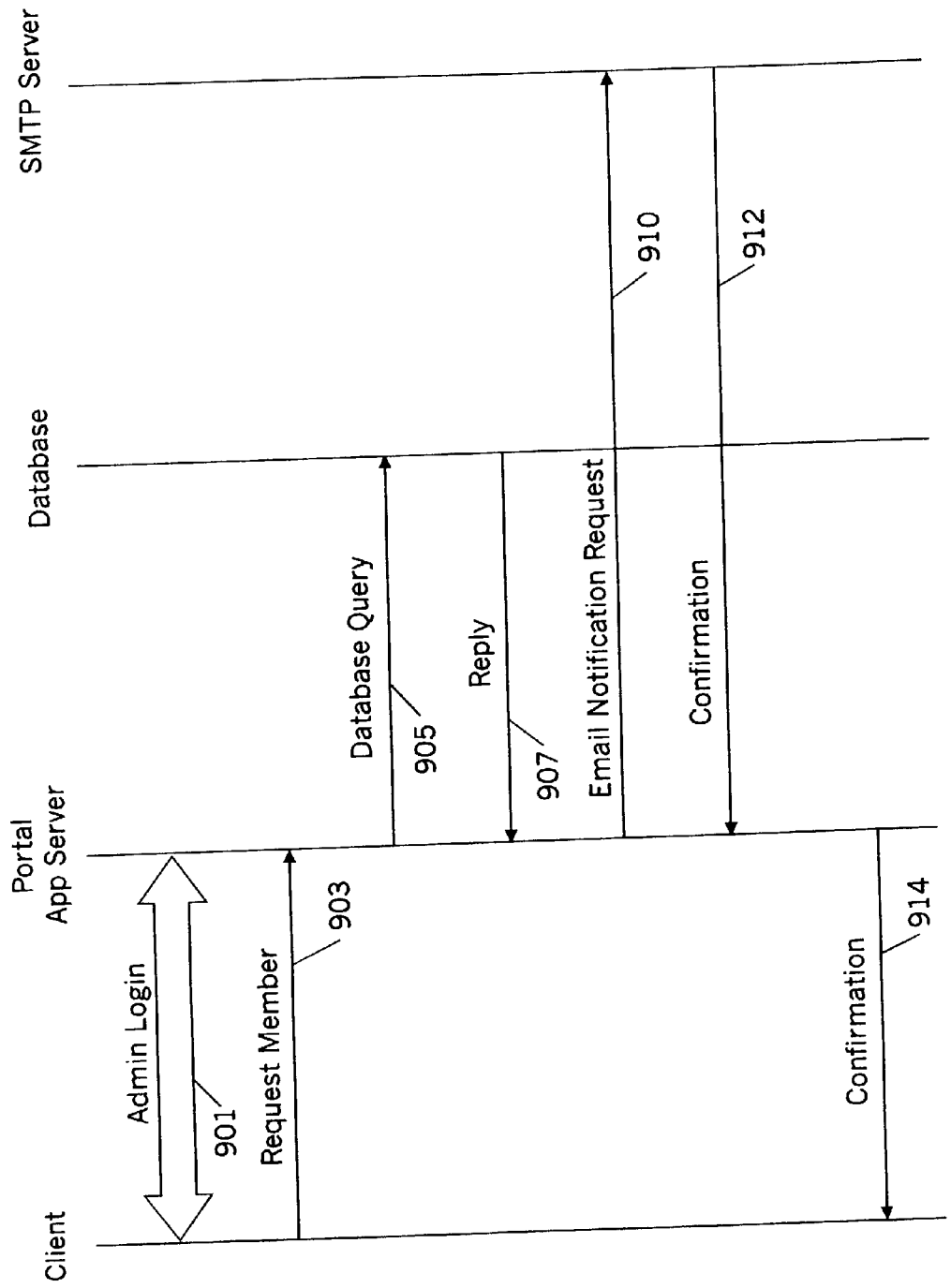
FIGS. 9-12 are further message flow diagrams further illustrating network activity taking place when the invention is in operation in a network like that of FIG. 7.

Team setup proceeds as shown in FIG. 9. It is assumed that an administrator has already logged in using the login proce-dure at 901. To set up a team member, for example, as a consultant, the administrator selects the prospect's name at 903, which requires hitting the SQL database at 905. Infor-mation is returned to the APP server at 907. An Email mes-sage request is sent to the SMTP server at 910 and confirmed by messages 912 and 914 when an Email is actually sent. A similar scenario takes place if the administrator was to select a team lead, and when the team lead was to select data review-ers or team members.

Figure 10:
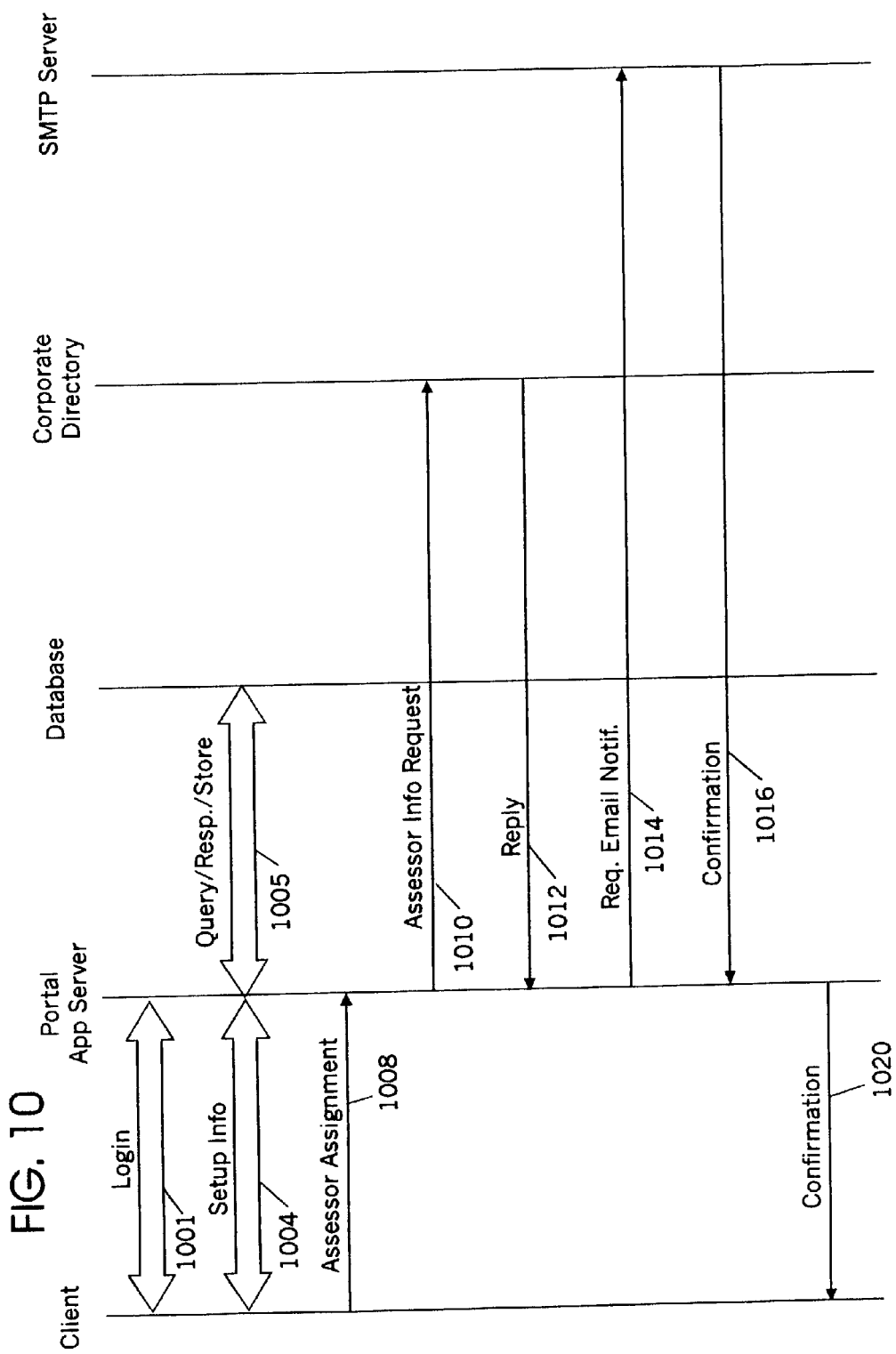

FIG. 10 illustrates an assessment setup. This process is an interaction involving the templates on the application portal server and the creation of new elements for the SQL database. The portal application, in essence, is a presentation layer. The process works as follows. After the login procedure at 1001, an instance of an assessment is created from the app server, where the type of assessment is selected, some time restric-tions are established, and a name for the assessment is selected. This process is illustrated at 1004 and 1005. The assessment can be created as a placeholder, with no personnel assigned to the assessment. More typically, the person setting up the assessment will assign people to the assessment. For example, to assign an assessor, a request is issued at 1008, and the app server gathers the necessary information on the asses-sor by requesting the information from the corporate direc-tory at 1010, and receiving the reply at 1012. To notify the assessor that they have been selected via an Email message, a request is made to the SMTP server at 1014. The Email message is confirmed at 1016 and 1020.

Figure 11:
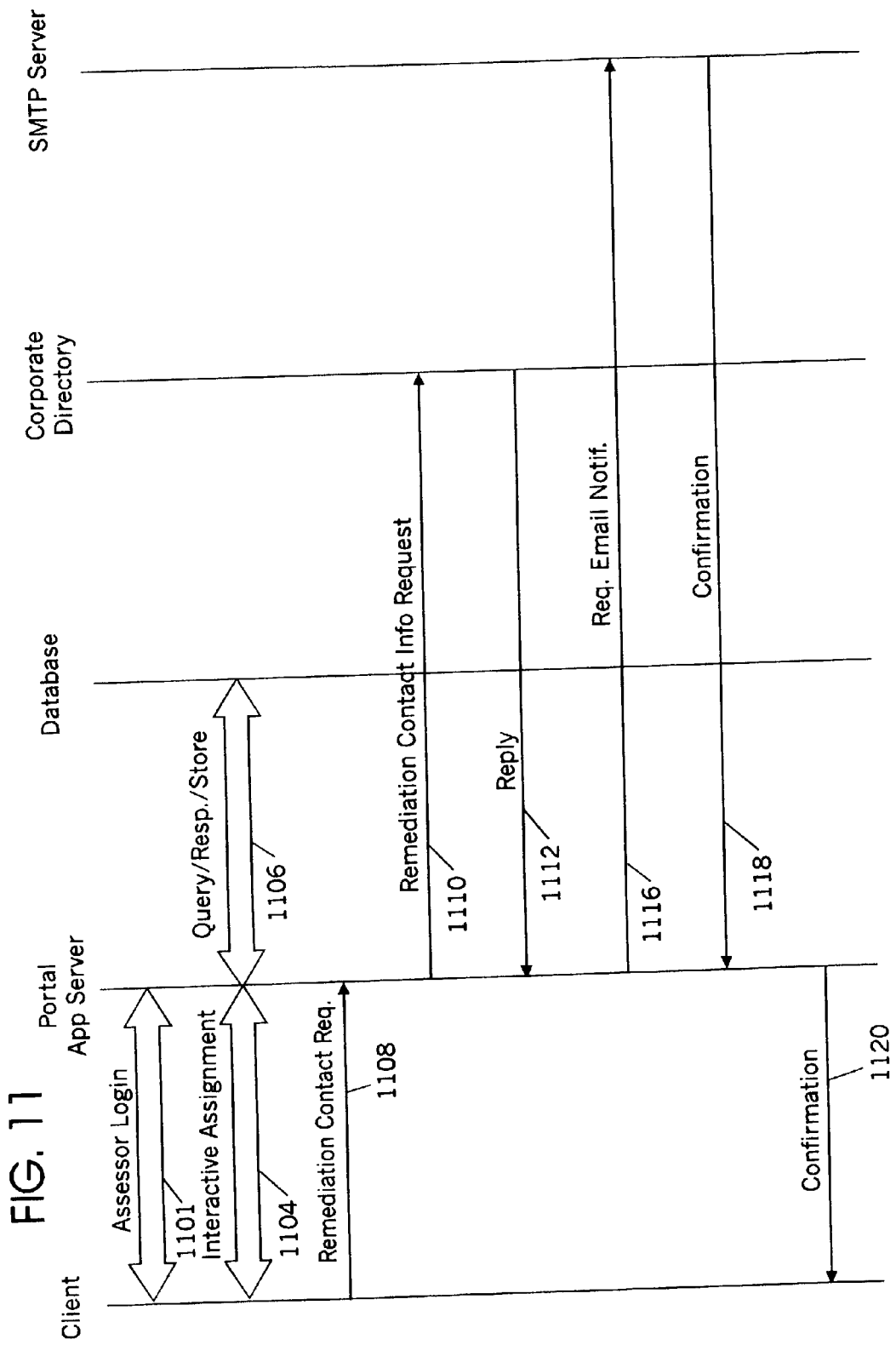

The assessment activity proceeds as shown in FIG. 11. The assessor logs in at 1101 and opens the assessment template via the risk assessment module on the app server. The assessor enters responses interactively as shown at 1104. The database is continually updated at shown at 1106. The template resides on the app server and the data in the SQL database. The assessor is able to leave his or her work part way through and return to continue from where he or she left off. It is possible to edit previously provided responses. Provisions can also be made for the assessor is able to print a blank assessment form for off-line fill-in; or print one with responses in place, in the event of a need for signature validation or verification elsewhere.

If a remediation plan is required, the assessor may determine a person to be named the plan contact, who has knowledge of the remediation and its status. This person may be a manager rather than a person who actually will personally fulfill the points of the remediation plan. This person is input at 1108, and the app server makes a request to the corporate directory at 1110 to retrieve the necessary information on the contact. A reply with the necessary information is returned at 1112. This information is then written to the database (this messaging is omitted for clarity but is the same as shown at 1106 ). The assessor completes the assessment form template on the app server. The remediation contact is notified, again by requesting an Email notification through the SMTP server as shown at 1116. The Email is confirmed at 1118 and 1120.

Figure 12:
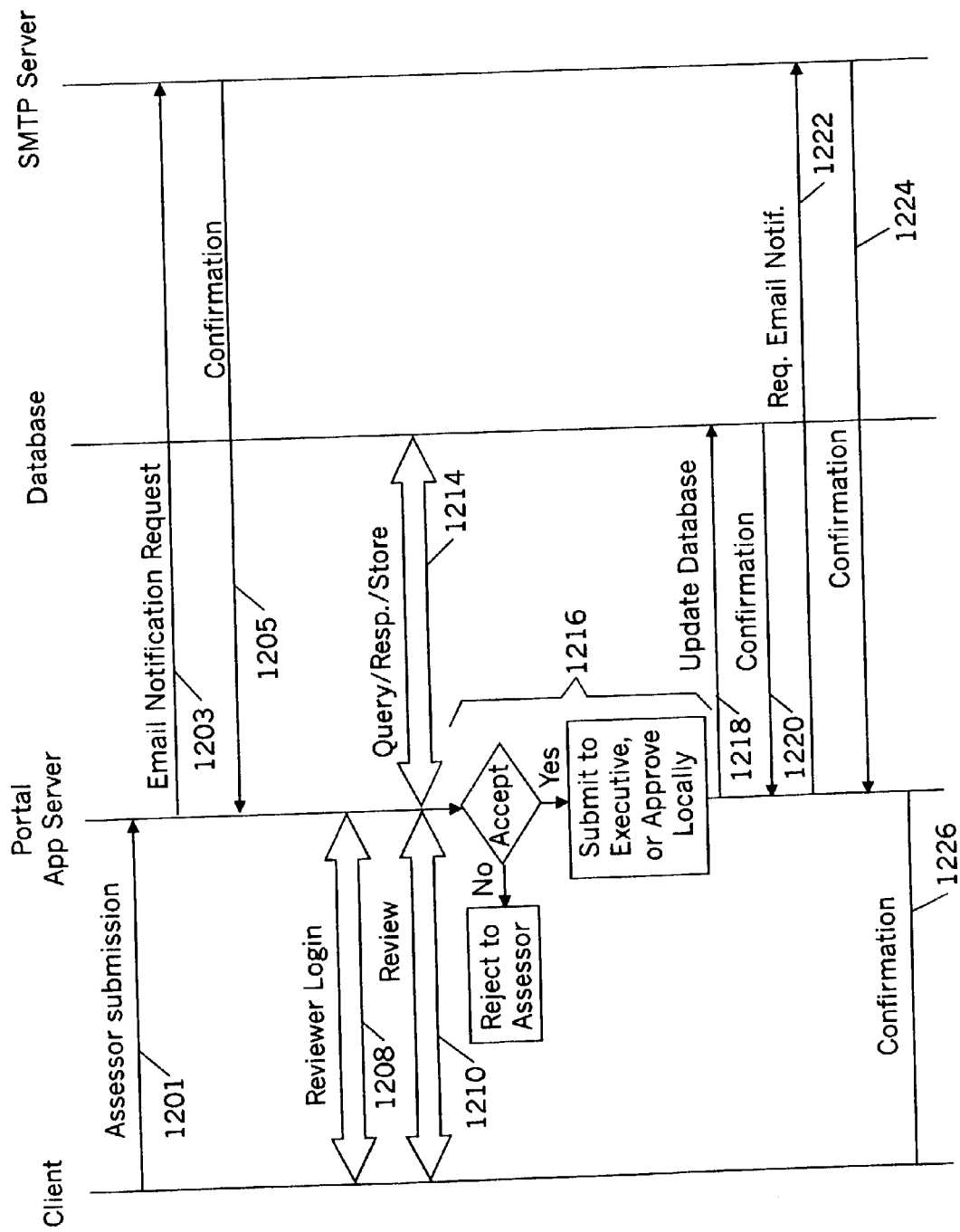

The assessment end activity is shown in FIG. 12. This activity begins with the completion and submission of the actual assessment as shown at 1201. In a large organization according to the example embodiment being presented here, there is a reviewer, also called a "data guardian." Once the assessment is submitted, the reviewer is notified via Email based on request 1203. The Email is confirmed at 1205. The SQL database is updated to change the status of the assessment from "in progress" to "awaiting data guardian."

The data guardian/reviewer logs onto system at 1208 and views a welcome page through the app server. The data guardian chooses an assessment to view, with the template residing on the app server and completed data in the SQL database. The data guardian is able to review and edit information in the assessment, and the database is kept updated, as shown at 1210 and 1214. At the completion of the review, the reviewer has the option of either rejecting the assessment back to the assessor or submitting it to the approval process, as illustrated at 1216. The approval process may include submitting to an executive if it is an important assessment, or has high overall, or individual risk ratings. Otherwise, the data guardian may approve the assessment.

What is moved to the executive and what remains with the data guardian can be pre-determined programmatically in accordance with the needs of the organization using these tools. The decision can be keyed to the responses and the risk ratings. If the data guardian rejects back to the assessor, the former can be presented with a form in which to note reasons for the rejection, which are written to the database. The assessor works through whatever corrective action needs to be taken on the assessment and re-submits it to the data guardian. Prior to actual re-submission, the assessor is presented with a note box where he or she is able to tell the reviewer what has been done to correct the situation. When the data guardian reviewer accesses the re-submission from his or her inbox, also available is the note from the assessor as well as the original note from the data guardian to the assessor. In any case, the database is updated at 1218 to account for the moving of the assessment back to the assessor, or into the approval process, and the update is confirmed at 1220. Each time an assessment moves from the responsibility of one actor to that of another, an Email notification can be generated to the person(s) who will next need to review the assessment. If an executive approval is required, the Email notification is requested at 1222, and confirmed at 1224 and 1226.

If the executive accepts the assessment and the plan, the assessment phase is completed. The ICPS can be designed to provide a means for the remediation plan contact to chart progress toward completion of the remediation plan by percent of completion rather than an individual-item check-off. In one embodiment, a drop-down box, accessed from a tab, displays that progress. A remediation plan can be terminated before completion, for example, when an application begins to sunset. In some embodiments, all information relative to an assessment and remediation plan is archived and thus available for review prior to the next assessment.

Risk assessment module screenshots discussed below include typical risk assessment questions and also screens that show detail of how comments are entered and risk values are established. The screenshots come from an example embodiment of GLBA compliance monitoring in a large financial services organization. All questions are designed so a "yes" response tends to indicate that controls are in place and a "no" response tends to indicate that controls are not in place. For "yes" responses, a validation control box is provided to substantiate the response and additional information is sought. As an example consider the question, "Have you trained your Associates in your area to the importance of not revealing consumer customer information to people on the telephone you haven't properly verified?" The answer, "Yes, we have semi-annual training," tends to indicate proper controls are in place, translating into a lower risk rating.

If there is a "no" response, comments are required in a comment box. The comment area is available for any other explanatory matter. If the assessor provides a "Not Applicable" (N/A) response, additional information is also required and the response activity to that question then stops. The risk rating for the question is based on three, intermediate numerical values, residual risk, probability of occurrence, also called "threat value," and an impact value. Based on the answer to the question and the additional information provided, the assessor is asked to rate the residual risk of the threat posed by the question using a numerical value. Typically, the numerical threat value is provided by the designers of the questions, for example, by the information security organization, and is a rating of the probability of occurrence for the threat posed by the question. An impact value evaluation is requested of the assessor. For example, if a customer's name and address were inadvertently revealed (which would be in violation of GLBA) the impact is less critical than if account balances, account numbers, and transactions were revealed. The system then takes the average of the three ratings to come to a risk rating for a question. Based on this rating, the assessor then determines whether current controls in place are sufficient or not. If not, remediation information is required. Based on the risk ratings for individual questions, an overall risk rating for the assessment can be determined.

Figure 13:
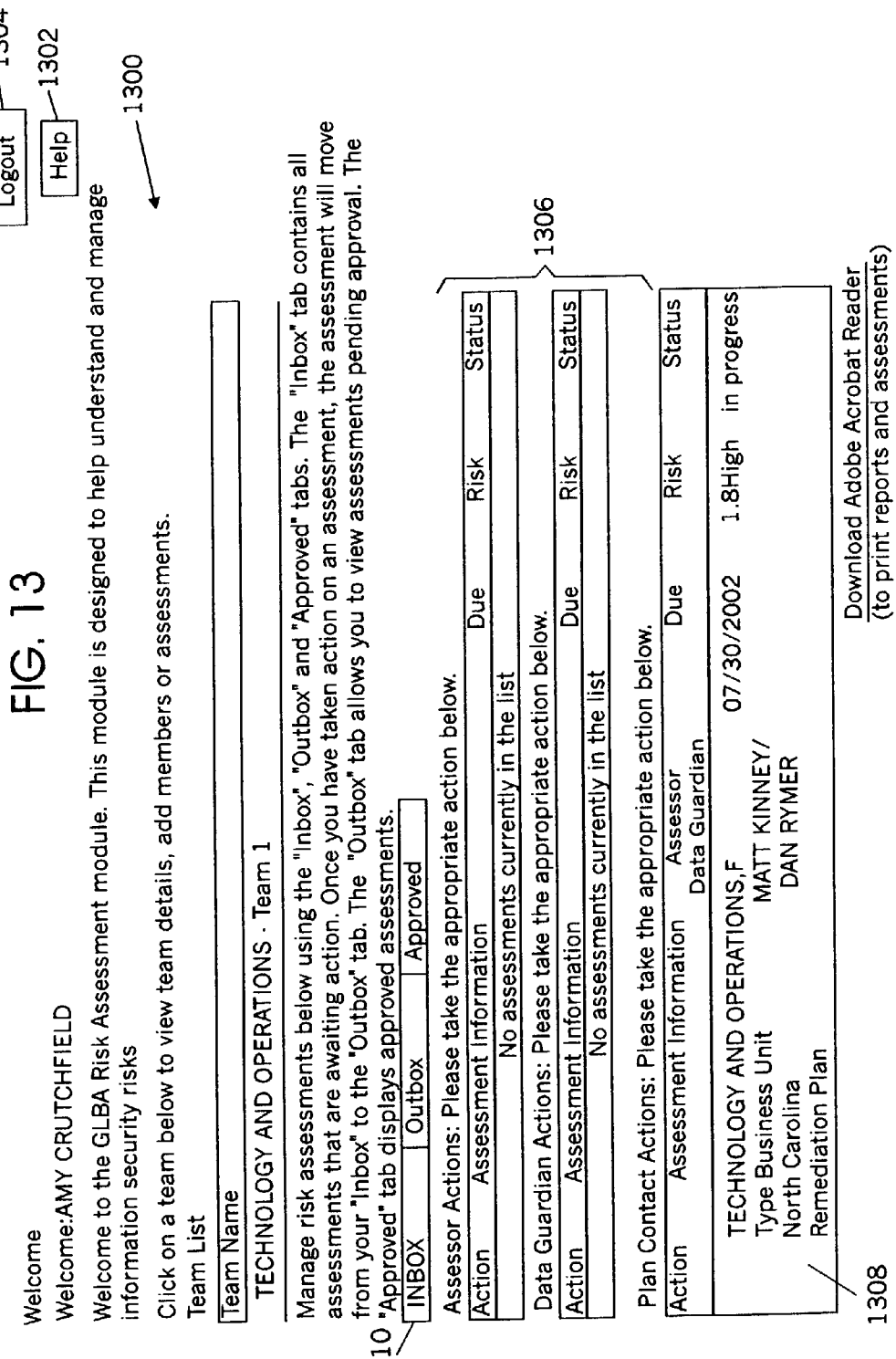
FIG. 13 is an example screen shot that might be encountered by a user of a computer implemented embodiment of the invention.

In this example embodiment, the invention is implemented in a web-based system. The browser "skin" (forward and back buttons, scroll bars, etc.) is not shown for clarity. FIG. 13 shows a welcome screen, 1300, for the assessment team. Help is provided via button 1302 and a user can logout via button 1304. Area 1306 displays pending actions for various key team members, and area 1308 shows details of the assessment. In this and screen renderings, tabs which are selected are labeled in all capital letters, as shown at 1310.

FIG. 14 is a screen, 1400, for an administrator to assign consultants to a Business Unit (BU). The persons assigned by this administrator are listed in screen area 1402.

FIG. 15 is a screen, 1500, for assigning additional Business Units to a specific regulatory consultant within the enterprise, in effect, a detail screen behind the screen in FIG. 14. In this case, the detail is for a GLBA consultant, Mike Kelly, who was assigned in the screen of FIG. 14. If Business Units to be assigned to Mr. Kelly need to be reassigned due to workload, change of resources, etc., this can be checked off using check boxes 1502 and the Re-Assign button below.

FIG. 16 is then the welcome screen, 1600, for the consultant, Mr. Kelly, from the previous two screen. This screen gives the consultant to manage teams for a business organization or "line of business" as selected at 1602.

Once the key members of an assessment team are in place, various screens give the team lead and other key team members access to information needed to manage an assessment and the workflow associated with the assessment. FIG. 17 and FIG. 18 provide but just two examples. FIG. 17 illustrates a team detail screen, 1700. Tabs 1702 and 1704 provide access to the team list, and the assessment list, respectively. Buttons 1706 and 1708 are provided to add team members, and add a reviewer or "data guardian,"0 respectively. If the assessment list tab is chosen and no assessments are set up, the user is prompted to set up a risk assessment via screen 1800 shown in FIG. 18. Note that dates are associated with the risk assessment at 1802, and a data guardian can be selected at 1804. Buttons shown at 1806 exit the screen by either saving the assessment settings or canceling out of the operation.

FIG. 19 shows how risk assessment questions are presented via a single screen, 1900. The top part of the screen is presented in FIG. 19A, the middle part of the screen is presented in FIG. 19B, and the bottom part of the screen is presented in FIG. 19C. In this example, only seven questions are shown. Most risk assessments would actually contain many more questions. If this entire screen did not fit in a web browser window, the normal scroll bar mechanism would automatically be provided with most operating systems and browsers. Tabs 1902 and 1904 are provided to move between the compliance-related questions and the remediation plans associated with the questions. When an assessor is ready to answer a question, she or he clicks on the "answer button," 1906, for the particular question. Once a response has been entered, the answer button changes to an "edit" button as shown at 1908, and some of the response and/or remediation detail is displayed as shown at 1909. In addition to the tabs at the top, an assessor may proceed to the remediation plans by clicking on button 1910 at the bottom of screen 1900. Note the intermediate numerical values for each question, risk, probability and impact (R, P, I) as well as the risk rating for the question, are displayed in the upper right corner, 1912 of each question's area once a response has been entered. The risk rating for a question is an expression of the compliance risk associated with the question, and hence, with the subject matter behind the question. A qualitative description of the risk rating, keyed to the risk rating value, can also be displayed, in this example, "High."

FIG. 20 shows a screen, 2000, used for providing question response detail. This screen is revealed if an answer or edit button is clicked on in the previous screen. Note how the risk information is entered at 2002 so that the risk rating for this question can be calculated as previously described. The assessor provides the intermediate numerical values for residual risk, and impact via radio buttons. The probability radio button, 2003, is grayed out in this example (indicated in the drawings with a box) because this has already been assigned for this question when the assessment was designed by the information security organization. Controls are entered in "validation control box" 2004, and the assessor indicates their sufficiency at 2006. The screen ties remediation comments 2008 and other comments entered in comment box 2009, to the risk rating information. Note the qualitative characterizations of the risk, "High," medium and "Low," as previously discussed are tied to specific values. Note also the remediation plan tab, 2010, which leads to a screen where remediation plan details for this question are entered.

Buttons for "Done," 2012, "Cancel," 2014, "Previous," 2016, and "Next," 2018 are shown at the bottom of the screen. Exiting of the screen by "Done," "Previous," or "Next" are subject to the following controls. A "Yes" answer to the initial question requires a text comment of controls at 2004. A "No" or "N/A" answer requires an explanation or reason to be entered at 2009. A rating for both "Residual Risk" and "Impact" must be entered at 2002 if either a "Yes" or "No" value is entered to the initial question. An overall "High" risk rating (average of R, P, I) will require a "No" answer at 2006. An overall "Low" risk rating will require a "Yes" answer at 2006. A "No" answer at 2006 will require a text comment on remediation planned at 2008. If required elements are not provided, an assessor cannot exit using the "Done," "Previous" or "Next" buttons (each of which save the responses). Exiting the screen by use of the "Cancel" button does not save input or changes and none of the previously listed programmatic controls need to be satisfied.

FIG. 21 illustrates the remediation plan screen, 2100, which is reached by selecting the appropriate tab in the previous screen. This screen repeats some of the response details and also has a place, 2101, to enter in scheduling information and a section, 2102, where the reviewer or "data guardian" can make recommendations regarding the implementation of the remediation plan.

An overall risk rating for the entire assessment can be based on how questions are scored with all questions weighted the same way, or, weighting can be provided. For this example, if no weighting is used, the overall risk rating can be the average of the seven individual question risk ratings, or of all the intermediate numerical value ratings. In this case, the overall risk rating is affected by the subjectivity of the assessor, but these affects can be mitigated by intelligent assessment design. For example, the assessment can be designed with multiple (and more granular) questions relative to specific areas so that a key area has more questions than an area considered less significant. Alternatively, the individual question risk ratings, or even the intermediate numerical values used to come up with the individual question risk ratings can be weighted, and the overall risk rating can be a weighted average. An assessment design of this type is well within the ordinary skill of those in the statistical and computing arts given a basic understanding of the invention based on this disclosure. Risk rating computations are stored in the common database.

The overall risk rating can be characterized as high, medium, or low, using the same criteria that has been illustrated for individual questions and intermediate numerical values. The system can be set up so that approvals required can be tied to this characterization as shown in the matrix:

|  | With approved remediation plan | Without approved remediation plan |
| --- | --- | --- |
| High | Executive or designee | Executive or designee |
| Medium | Data Guardian | Executive or designee |
| Low | Data Guardian | Data Guardian |

The screenshots and the steps associated with them discussed above are but a small sample of what would make up an actual assessment implemented as part of the system of the invention. There are also many ways the illustrated screens could be designed. Those of ordinary skill in the web authoring arts can easily design all the appropriate screens given an understanding of the basics of the invention as disclosed above.

Specific embodiments of an invention are described herein. One of ordinary skill in the computing and networking arts will quickly recognize that the invention has other applications in other environments. In fact, many embodiments and implementations are possible. The following claims are in no way intended to limit the scope of the invention to the specific embodiments described above.

We claim:

1. A computer-implemented method of monitoring compliance for an organization, the computer-implemented method comprising the steps of:

providing, using a central processing unit (CPU), a plurality of compliance-related questions to participants of compliance monitoring for an organization, wherein the participants include at least one question designer and at least one assessor;

assigning by the at least one question designer, in a data processing system, a probability of occurrence value to each of the plurality of compliance-related questions, wherein the probability of occurrence value is a rating for a probability of occurrence for a threat posed by a compliance-related question;

collecting from the at least one assessor, in the data processing system, a plurality of responses to the plurality of compliance-related questions, wherein the plurality of responses include assigning a residual risk value and an impact value to each of the plurality of compliance-related questions, wherein the residual risk value is a value of the threat posed by the compliance-related question, and wherein the impact value is a value of how critical is a result of the threat posed by the compliance-related question if the threat is realized;

establishing, using the CPU, a risk rating for each of the compliance-related questions, the risk rating determined from averaging together the values for residual risk, probability of occurrence, and impact, so as to express the risk rating as a function of the residual risk value, probability of occurrence value, and impact value for each of the plurality of compliance-related questions; and producing, using the CPU, an assessment including at least some of the plurality of responses and the risk rating for at least some of the plurality of compliance-related questions.

2. The computer-implemented method of claim 1 further comprising the step of calculating, using the CPU, an overall risk rating based on the risk rating for at least some of the plurality of compliance-related questions and wherein the assessment further includes the overall risk rating.

3. The computer-implemented method of claim 2 further comprising the step of acquiring, in the data processing system, an approval for the assessment.

4. The computer-implemented method of claim 3 further comprising the step of recording, in the data processing system, a remediation plan associated with at least one of the plurality of compliance-related questions and wherein the assessment includes the remediation plan.

5. The computer-implemented method of claim 4 further comprising the step of tracking actions associated with the remediation plan in the CPU.

6. The computer-implemented method of claim 2 further comprising the step of recording, in the data processing system, a remediation plan associated with at least one of the plurality of compliance-related questions and wherein the assessment includes the remediation plan.

7. The computer-implemented method of claim 6 further comprising the step of tracking actions associated with the remediation plan using the CPU.

8. The computer-implemented method of claim 1 further comprising the step of acquiring, in the data processing system, an approval for the assessment.

9. The computer-implemented method of claim 8 further comprising the step of recording, in the data processing system, a remediation plan associated with at least one of the plurality of compliance-related questions and wherein the assessment includes the remediation plan.

10. The computer-implemented method of claim 9 further comprising the step of tracking actions associated with the remediation plan using the CPU.

11. The computer-implemented method of claim 1 further comprising the step of recording, in the data processing system, a remediation plan associated with at least one of the plurality of compliance-related questions and wherein the assessment includes the remediation plan.

12. The computer-implemented method of claim 11 further comprising the step of tracking actions associated with the remediation plan using the CPU.

13. A non-transitory computer readable medium having stored thereon a computer program code, the computer program code including instructions which, when executed by a processor, cause the processor to perform the method comprising:

providing a plurality of compliance-related questions to participants of compliance monitoring for an organization, wherein the participants include at least one question designer and at least one assessor;

assigning by the at least one question designer a probability of occurrence value to each of the plurality of compliance-related questions, wherein the probability of occurrence value is a rating for a probability of occurrence for a threat posed by a compliance-related question;

collecting from the at least one assessor a plurality of responses to the plurality of compliance-related questions;

assigning by the at least one assessor a residual risk value and an impact value to each of the plurality of compliance-related questions, wherein the residual risk value is a value of the threat posed by the compliance-related question, and wherein the impact value is a value of how critical is a result of the threat posed by the compliance-related question if the threat is realized;

establishing risk ratings comprising at least a risk rating for each of the plurality of compliance-related questions based on the responses, the risk rating determined from averaging together the values provided for residual risk, probability of occurrence, and impact, so as to express the risk rating as a function of the residual risk value, probability of occurrence value, and impact value for each of the plurality of compliance-related questions; and producing an assessment including at least some of the plurality of responses and at least some of the risk rating for each of the plurality of compliance-related questions.

14. The non-transitory computer readable medium of claim 13 further comprising acquiring an approval for the assessment.

15. The non-transitory computer readable medium of claim 14 further comprising recording a remediation plan associated with at least one of the plurality of compliance-related questions.

16. The non-transitory computer readable medium of claim 15 further comprising tracking actions associated with the remediation plan.

17. The non-transitory computer readable medium of claim 13 further comprising recording a remediation plan associated with at least one of the plurality of compliance-related questions.

18. The non-transitory computer readable medium of claim 17 wherein the computer program further comprises instructions for tracking actions associated with the remediation plan.

19. Apparatus for facilitating compliance monitoring, the apparatus comprising:

means for providing a plurality of compliance-related questions to participants of compliance monitoring for an organization, wherein the participants include at least one question designer and at least one assessor;

means for assigning by the at least one question designer a probability of occurrence value to each of the plurality of compliance-related questions, wherein the robabilit of occurrence value is a ratin for a ,robabilit of occurrence for a threat posed by a compliance-related question;

means for collecting from the at least one assessor a plurality of responses to a plurality of compliance-related questions;

means for assigning by the at least one assessor a residual risk value and an impact value to each of the plurality of compliance-related questions, wherein the residual risk value is a value of the threat posed by the compliance-related question, and wherein the impact value is a value of how critical is a result of the threat posed by the compliance-related question if the threat is realized;

means for establishing risk ratings comprising at least a risk rating for each of the plurality of compliance-related questions based on the responses, the risk rating determined from averaging together the values for residual risk, probability of occurrence, and impact, so as to express the risk rating as a function of the residual risk value, probability of occurrence value, and impact value for each of the plurality of compliance-related questions; and means for producing an assessment including at least some of the responses and at least some of the risk ratings.

20. The apparatus of claim 19 further comprising means for acquiring an approval for the assessment.

21. The apparatus of claim 20 further comprising means for recording a remediation plan associated with at least one of the plurality of compliance-related questions.

22. The apparatus of claim 21 further comprising means for tracking actions associated with the remediation plan.

23. The apparatus of claim 19 further comprising means for recording a remediation plan associated with at least one of the plurality of compliance-related questions.

24. The apparatus of claim 23 further comprising means for tracking actions associated with the remediation plan.

25. A system for facilitating compliance monitoring, the system comprising:

an instruction execution platform further comprising a memory device and a processing device operatively coupled to the memory device, wherein the processing device is configured to execute computer-readable program code of at least one application module, wherein the at least one application module comprises at least:

a risk assessment module, the risk assessment module operable to produce an assessment by:

providing a plurality of compliance-related questions to participants of compliance monitoring for an organization, wherein the participants include at least one question designer and at least one assessor;

assigning by the at least one question designer a probability of occurrence value to each of the plurality of compliance-related questions, wherein the probability of occurrence value is a rating for a probability of occurrence for a threat posed by a compliance-related question, collecting responses from the at least one assessor wherein the responses include assigning a residual risk value and an impact value to each of the plurality of compliance-related questions, wherein the residual risk value is a value of the threat posed by the compliance-related question, and wherein the impact value is a value of how critical is a result of the threat posed by the compliance-related question if the threat is realized, determining risk ratings from averaging together the values provided for residual risk, probability of occurrence, and impact, so as to express the risk rating as a function of the residual risk value, probability of occurrence value, and impact value, and producing the assessment including at least some of the responses and at least some of the risk ratings; and a database operatively coupled to the instruction execution platform for storing and retrieving data produced by the at least one application module and operable to facilitate review, approval and action tracking related to the assessment.

26. The system of claim 25 wherein the database is disposed within the instruction execution platform.

27. The system of claim 26 wherein the risk assessment module further comprises a plurality of tailored risk assessment templates.

28. The system of claim 25 wherein the database is disposed within a server which is operatively connected to the at least one application module through a network.

29. The system of claim 28 wherein the at least one application module is accessed by a user via a web page.

30. The system of claim 29 further comprising an email server for sending email notifications related to the assessment.

31. The system of claim 30 wherein the risk assessment module further comprises a plurality of tailored risk assessment templates.

32. The system of claim 29 wherein the risk assessment module further comprises a plurality of tailored risk assessment templates.

33. The system of claim 28 wherein the risk assessment module further comprises a plurality of tailored risk assessment templates.

34. The system of claim 25 wherein the risk assessment module further comprises a plurality of tailored risk assessment templates.

35. A computer-implemented method of achieving and monitoring compliance for an organization, the computer-implemented method comprising:

selecting, from a database, participants for achieving and monitoring compliance for an organization, wherein the participants include at least one question designer and at least one assessor;

designing by the at least one question designer, in a data processing system, a plurality of compliance-related questions, wherein the at least one question designer assigns a probability of occurrence value to each of the plurality of compliance-related questions, wherein the probability of occurrence value is a rating for a probability of occurrence for a threat posed by a compliance-related question;

collecting from the at least one assessor, in the data processing system, a plurality of responses to the plurality of compliance-related questions;

assigning, in the data processing system, a residual risk value and an impact value to each of the plurality of compliance-related questions by the at least one assessor, wherein the residual risk value is a value of the threat posed by the compliance-related question, and wherein the impact value is a value of how critical is a result of the threat posed by the compliance-related question if the threat is realized;

determining, using a central processing unit (CPU), a risk rating for each of the plurality of compliance-related questions, the risk rating determined from averaging together the value assigned for probability of occurrence by the question designer and the values assigned for residual risk and impact by the assessor, so as to express the risk rating as a function of the residual risk value, probability of occurrence value, and impact value for each of the plurality of compliance related questions; and producing, using the CPU, an assessment including at least some of the plurality of responses and the risk rating for at least some of the plurality of compliance-related questions.

36. The computer-implemented method of claim 35, wherein the participants further include at least one data guardian for reviewing the assessment prior to approval.

37. The computer-implemented method of claim 35, wherein the participants further include at least one approver for providing approval of the assessment, wherein the at least one approver for providing approval of the assessment is selected from the group consisting of a data guardian and an executive.

38. The computer-implemented method of claim 35, wherein the at least one assessor provides at least one remediation plan for at least one of the plurality of compliance-related questions.

39. The computer-implemented method of claim 38, wherein the at least one remediation plan comprises training employees of the organization on compliance requirements.

40. The system of claim 25 further comprising a training module operatively connected to the instruction execution platform to train employees on compliance requirements.

41. The computer-implemented method of claim 35, wherein the overall risk rating includes a weighting of the responses to the plurality of compliance-related questions.

\* \* \* \* \*